US009869573B2

United States Patent
Kawai et al.

(10) Patent No.: US 9,869,573 B2
(45) Date of Patent: Jan. 16, 2018

(54) PHYSICAL AMOUNT MEASUREMENT APPARATUS MOUNTED INTEGRALLY WITH FLOW RATE MEASUREMENT APPARATUS, AND PHYSICAL AMOUNT MEASUREMENT METHOD

(71) Applicant: MITSUBISHI ELECTRIC CORPORATION, Tokyo (JP)

(72) Inventors: Masahiro Kawai, Tokyo (JP); Yuji Ariyoshi, Tokyo (JP); Koji Tanimoto, Tokyo (JP); Shinichiro Hidaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 223 days.

(21) Appl. No.: 14/834,503

(22) Filed: Aug. 25, 2015

(65) Prior Publication Data
US 2016/0273949 A1    Sep. 22, 2016

(30) Foreign Application Priority Data
Mar. 16, 2015   (JP) ................................ 2015-051689

(51) Int. Cl.
*G01M 15/04*   (2006.01)
*G01F 1/69*    (2006.01)
(Continued)

(52) U.S. Cl.
CPC ................ *G01F 1/69* (2013.01); *G01F 1/696* (2013.01); *G01F 1/6965* (2013.01);
(Continued)

(58) Field of Classification Search
USPC ............... 73/114.31, 114.32, 114.33, 114.34, 73/114.35
See application file for complete search history.

(56) References Cited

U.S. PATENT DOCUMENTS 7,942,052 B2 *  5/2011  Ariyoshi ............... G01F 1/6842
                                                    73/202.5
8,899,103 B2 * 12/2014  Ariyoshi ................... G01F 5/00
                                                    73/114.34
(Continued)

FOREIGN PATENT DOCUMENTS

JP              8-297040 A    11/1996
JP           2001-124606 A     5/2001
(Continued)

OTHER PUBLICATIONS

Communication dated Feb. 9, 2016 from the Japanese Patent Office issued in corresponding Application No. 2015-051689.

*Primary Examiner* — Eric S McCall
(74) *Attorney, Agent, or Firm* — Sughrue Mion, PLLC; Richard C. Turner

(57) ABSTRACT

Provided is an intake air temperature detection apparatus mounted integrally with a flow rate measurement apparatus, the intake air temperature detection apparatus having temperature measurement precision improved by increasing thermal responsiveness of an intake air temperature detection part that is arranged in a measurement passage of the flow rate measurement apparatus and detects a temperature of intake air, which is a fluid to be measured. The intake air temperature measurement apparatus includes: the intake air temperature detection part for detecting a temperature of the intake air in the measurement passage of the flow rate measurement apparatus; and an intake air temperature detection circuit part arranged in a circuit accommodating part of the flow rate measurement apparatus, for generating a signal obtained by carrying out phase lead correction on a signal representing a result of detection by the intake air temperature detection part.

17 Claims, 14 Drawing Sheets

(51) Int. Cl.
*G01F 1/696* (2006.01)
*G01F 15/04* (2006.01)
*G01F 1/684* (2006.01)
*G01F 5/00* (2006.01)

(52) U.S. Cl.
CPC .......... *G01F 15/046* (2013.01); *G01F 1/6842* (2013.01); *G01F 5/00* (2013.01)

(56) References Cited

U.S. PATENT DOCUMENTS

| | | | | |
|---|---|---|---|---|
| 2004/0226357 A1* | 11/2004 | Tanimoto | ............. | G01F 1/6842 73/202.5 |
| 2010/0000308 A1* | 1/2010 | Ariyoshi | ................ | G01F 1/72 73/114.32 |
| 2011/0088464 A1* | 4/2011 | Ariyoshi | ............... | G01F 1/6842 73/204.27 |
| 2012/0000280 A1* | 1/2012 | Kishikawa | ............ | G01F 1/6842 73/204.22 |
| 2014/0190270 A1* | 7/2014 | Suzuki | ................... | G01F 1/696 73/861.03 |
| 2014/0224004 A1* | 8/2014 | Ariyoshi | ................... | G01F 1/69 73/114.34 |
| 2015/0330324 A1* | 11/2015 | Kawai | ....................... | G01F 1/69 73/114.34 |
| 2016/0011031 A1* | 1/2016 | Asano | ..................... | G01F 1/692 73/114.34 |
| 2016/0116314 A1* | 4/2016 | Akagi | ................... | G01F 1/6842 73/861.08 |
| 2016/0202200 A1* | 7/2016 | Nakano | .................. | G01N 27/18 73/23.31 |

FOREIGN PATENT DOCUMENTS

| | | |
|---|---|---|
| JP | 2005-36691 A | 2/2005 |
| JP | 2006-138688 A | 6/2006 |
| JP | 2008-82816 A | 4/2008 |
| JP | 4650082 B2 | 3/2011 |
| JP | 2014-10026 A | 1/2014 |

* cited by examiner

PHYSICAL AMOUNT MEASUREMENT APPARATUS MOUNTED INTEGRALLY WITH FLOW RATE MEASUREMENT APPARATUS, AND PHYSICAL AMOUNT MEASUREMENT METHOD

BACKGROUND OF THE INVENTION

1. Field of the Invention

The present invention relates to a flow rate measurement apparatus and the like to be used, for example, for measuring an intake air flow rate and an intake air temperature of an internal combustion engine, and more particularly, to a physical amount measurement apparatus and a physical amount measurement method for measuring a physical amount of a fluid to be measured simultaneously with a detected value of the flow rate measurement apparatus.

2. Description of the Related Art

In fuel injection control for an internal combustion engine, an intake air flow rate is the most important information for determining an optimal fuel injection amount. Moreover, physical amounts of the intake air such as an intake air temperature and an intake air absolute humidity are used for correcting the fuel injection control and ignition timing control, and are information important for improving precision of internal combustion engine control. In this context, a physical amount measurement apparatus mounted integrally with a flow rate measurement apparatus can reduce workloads of mounting the measurement apparatus and the number of components to achieve reduction in size and cost by integrally constructing the flow rate measurement apparatus for measuring the flow rate and the physical amount measurement apparatus for measuring the physical amount. In such a related-art flow rate measurement apparatus including an intake air temperature detection apparatus for detecting the intake air temperature, which is a physical amount of the intake air, there is known an apparatus in which a flow rate detection element for measuring a flow rate in a measurement passage for taking a part of the intake air is arranged in the measurement passage, and an intake air temperature detection element for measuring the intake air temperature is arranged in the measurement passage or a main passage.

A semiconductor element including a flow rate detection part formed of a thin film having a thickness in the order of micron is used as the flow rate detection element. Moreover, a thermistor is used as the intake air temperature detection element.

In general, a support member is arranged to mount the intake air temperature detection element thereon. However, heat transferred from the support member influences intake air temperature detection precision. Moreover, if a support member with low heat conductivity is used, it is difficult to reduce the cost.

Thus, the following structures and signal processing have been proposed as a flow rate measurement apparatus that can simultaneously improve the intake air temperature measurement precision and reduce the cost, and can provide high robustness and high reliability.

In a related-art flow rate measurement apparatus, an intake air temperature detection element is arranged in a curved measurement passage, and connector terminals and support terminals are separated from each other, thereby decreasing influence of heat transferred from the support member to the detection element (for example, refer to Japanese Patent Application Laid-open No. 2001-124606).

Moreover, in a related-art flow rate measurement apparatus, the flow rate detection element and the intake air temperature detection element are arranged and integrated on a single substrate, thereby reducing the cost.

Further, in a detection element in which the flow rate detection element and the intake air temperature detection element are formed on the single substrate, heat capacities of the intake air temperature detection element and the support member including a substrate part on which the intake air temperature detection element is arranged are reduced by forming the intake air temperature detection element on a diaphragm, thereby improving response speed to the intake air temperature.

Further, a voltage applied to the intake air temperature detection element is pulse-driven to reduce an influence of self-heat generation of the intake air temperature detection element, thereby improving the intake air temperature measurement precision (for example, refer to Japanese Patent Application Laid-open No. 2006-138688).

Further, in related-art means for calculating physical amounts including the flow rate, the measurement apparatus includes physical amount measured value change amount integration means for integrating a change amount in a measured value of physical amount measurement means for measuring a physical amount to be measured, model measured value calculation means for calculating an object to be measured by the physical amount measurement means as a model measured value based on information other than those on the object to be measured, and model measured value change amount integration means for integrating a change amount in the model measured value. A deviation from the model measured value change amount integrated value and the physical amount measured value change amount integrated value is calculated, and the deviation is added to the physical amount measured value to calculate an ideal value of the physical amount, thereby improving physical amount measurement precision (for example, refer to Japanese Patent No. 4650082).

As described above, in the related-art flow rate measurement apparatus, the structures and the signal processing for improving the detection precision of the detection element for detecting the intake air temperature have been proposed. However, in the flow rate measurement apparatus according to Japanese Patent Application Laid-open No. 2001-124606 and Japanese Patent Application Laid-open No. 2006-138688, there is a problem in that, if the intake air temperature detection element is arranged in a measurement passage or a circuit accommodating part that has such a large heat capacity as to cause a delay in a temperature change with respect to a change in an intake air temperature in a main passage, improving the intake air temperature measurement precision of the intake air temperature detection element itself does not result in desired intake air temperature detection precision.

Moreover, in the physical amount calculation apparatus according to Japanese Patent No. 4650082, the model measured value, which is the ideal value of the physical amount, needs to be calculated based on information other than those on the measurement apparatus for measuring the physical amount of the object to be measured, and hence there is a problem in that a large number of evaluation workloads are required to correct precision and variation of physical amount information necessary to calculate the model measured value.

Further, a calculation apparatus with high signal processing capability is necessary in order to calculate the model measured value, and hence there is a problem in that it is difficult to reduce the cost.

SUMMARY OF THE INVENTION

The present invention has been made in order to solve the above-mentioned problems, and therefore has an object to provide a physical amount measurement apparatus mounted integrally with a flow rate measurement apparatus and a physical amount measurement method for increasing a response speed to a physical amount including an intake air temperature by carrying out phase lead processing on a physical amount signal measured by a detection element for detecting the physical amount, thereby simultaneously realizing highly precise physical amount measurement and reduction in cost.

According to one embodiment of the present invention, there are provided a physical amount measurement apparatus mounted integrally with a flow rate measurement apparatus and the like, for measuring a physical amount, the flow rate measurement apparatus including: a main body part extending inward from an outside of a main passage of a fluid to be measured, the main body having a circuit accommodation part formed therein; a measurement passage formed on a tip side of the main body part, for causing a part of the fluid to be measured to flow therethrough, the measurement passage having a flow rate detection part formed therein; and a flow rate detection circuit part arranged in the circuit accommodation part, for generating a signal representing a result of detection by the flow rate detection part, the physical amount measurement apparatus including: a physical amount detection part for detecting a physical amount relating to the fluid to be measured in the flow rate measurement apparatus; and a physical amount detection circuit part arranged in the circuit accommodation part, for generating a signal acquired by carrying out phase lead correction on a signal representing a result of detection by the physical amount detection part.

According to the one embodiment of the present invention, there can be provided a highly precise and low cost physical amount measurement apparatus mounted integrally with a flow rate measurement apparatus and a physical amount measurement method, which have improved response speed to the change in the physical amount in the fluid to be measured by carrying out, by the physical amount detection circuit, the phase lead correction on the physical amount signal from the physical amount detection part.

DETAILED DESCRIPTION OF THE PREFERRED EMBODIMENTS

First Embodiment

Referring to FIG. 1 to FIG. 9, a description is now given of a physical amount measurement apparatus mounted integrally with a flow rate measurement apparatus according to a first embodiment of the present invention. In the following description, for example, a fluid to be measured is intake air, and a physical amount is a temperature of the intake air.

Figure 1:
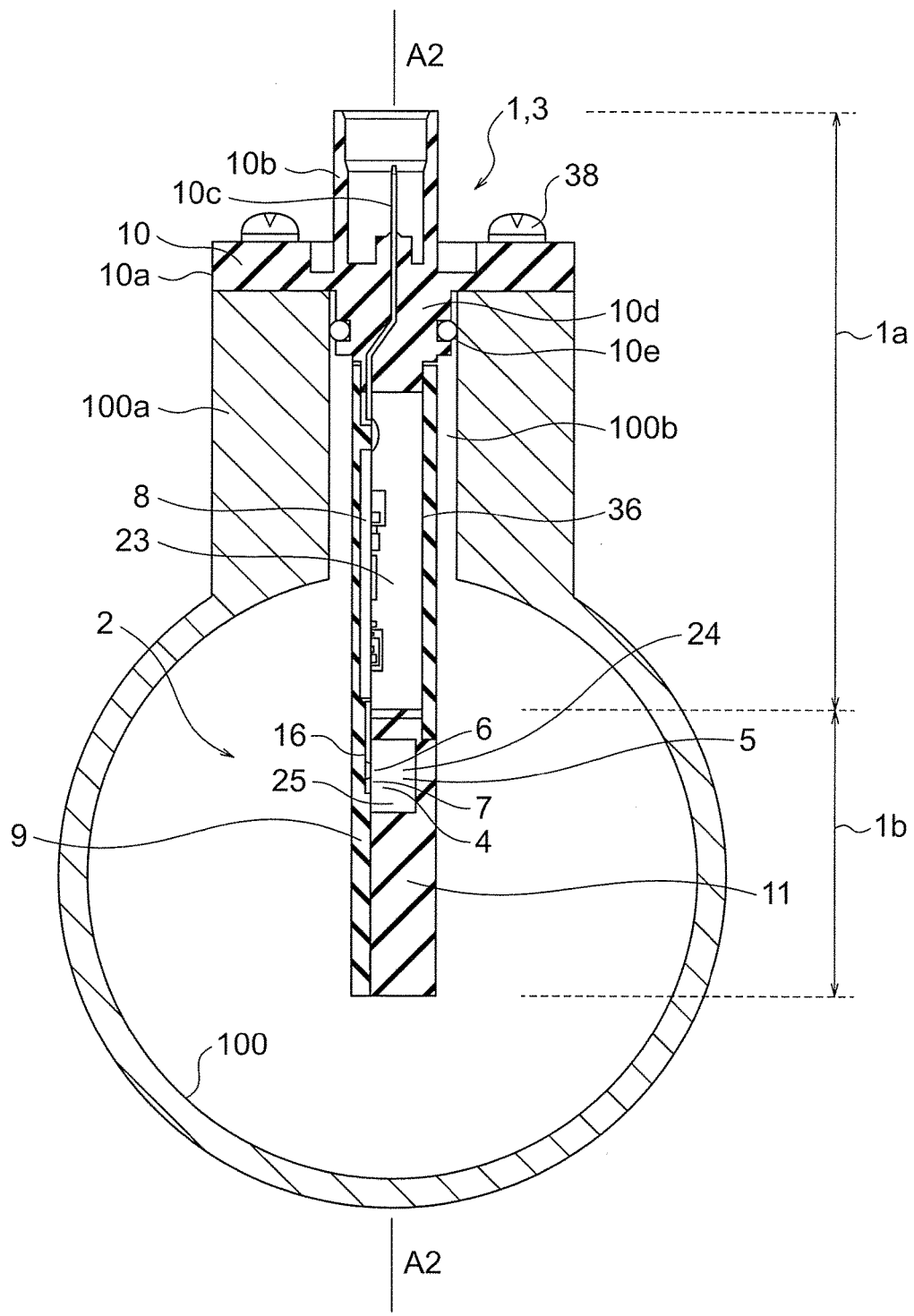
FIG. 1 is a cross sectional view perpendicular to a main passage, for illustrating a state in which a flow rate measurement apparatus including a physical amount measurement apparatus according to a first embodiment of the present invention is mounted to the main passage.
Figure 2:
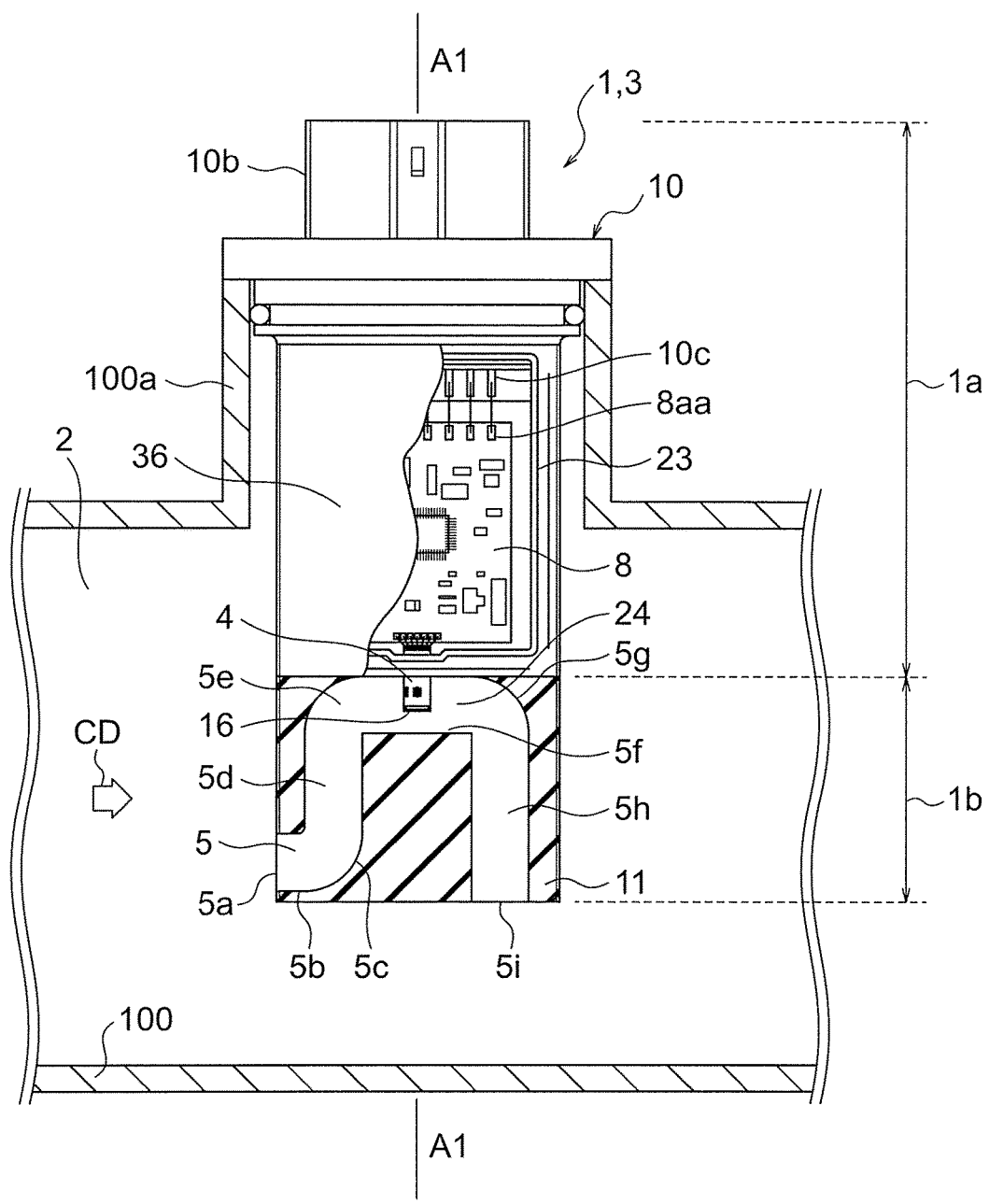
FIG. 2 is a cross sectional view parallel to the main passage, for illustrating the state in which the flow rate measurement apparatus including the physical amount measurement apparatus according to the first embodiment of the present invention is mounted to the main passage.

FIG. 1 and FIG. 2 are diagrams for illustrating a state in which a flow rate measurement apparatus 1 including the physical amount measurement apparatus according to the first embodiment is inserted and mounted into a main passage 2 of a pipe 100 through which the fluid to be measured flows. FIG. 1 is a cross sectional view (cross sectional view taken along the line A1-A1 of FIG. 2) perpendicular to a flow direction (CD of FIG. 2) of the fluid to be measured in the main passage 2. FIG. 2 is a cross sectional view (cross sectional view taken along the line A2-A2 of FIG. 1) parallel to the flow direction CD in which the fluid to be measured flows.

Figure 3:
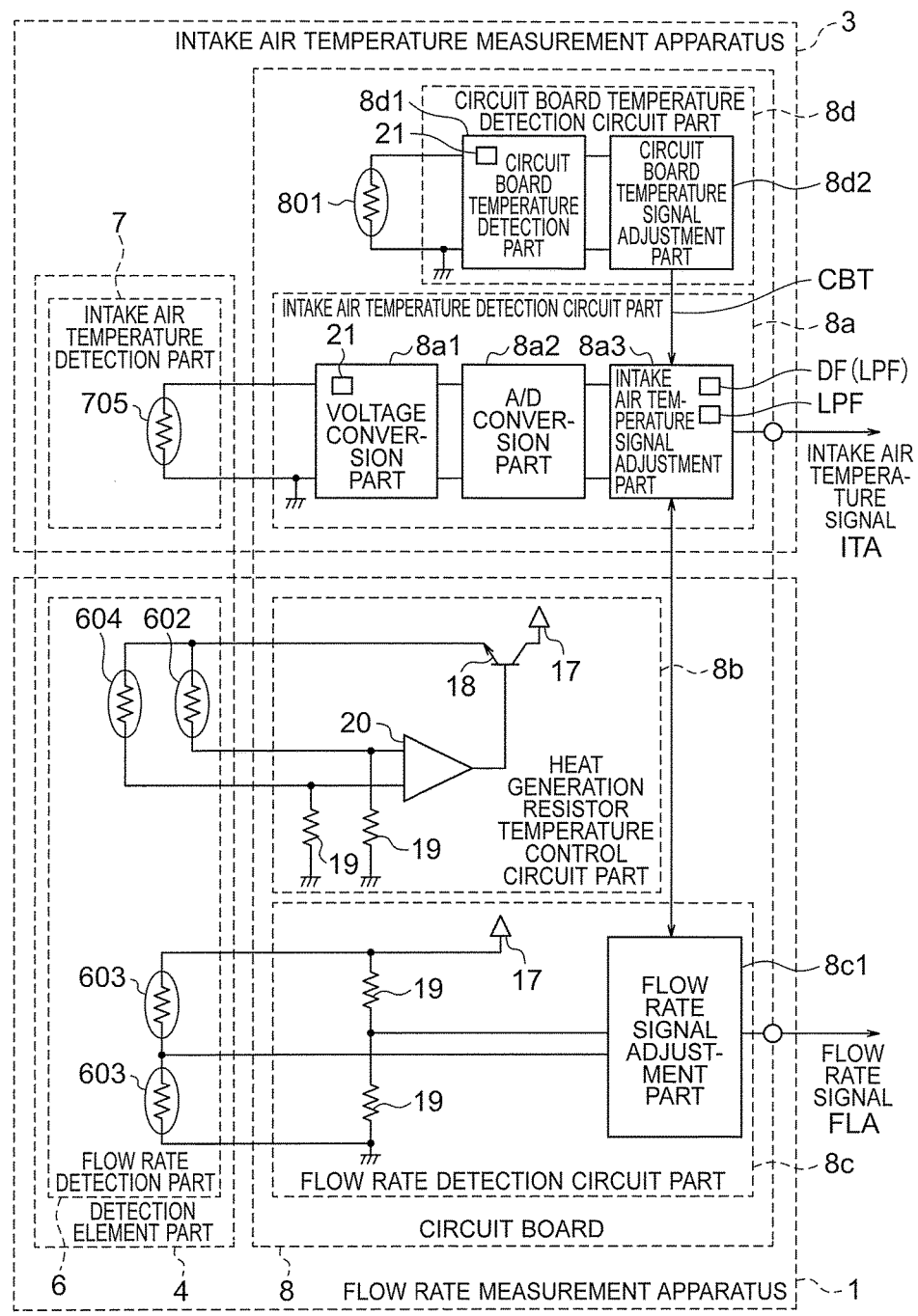
FIG. 3 is a circuit diagram for illustrating a schematic configuration of the flow rate measurement apparatus including the physical amount measurement apparatus according to the first embodiment of the present invention.

FIG. 3 is a circuit diagram for illustrating a schematic configuration of a detection part of the flow rate measurement apparatus 1 integrally including an intake air temperature measurement apparatus 3, which is the physical amount measurement apparatus.

Figure 4:
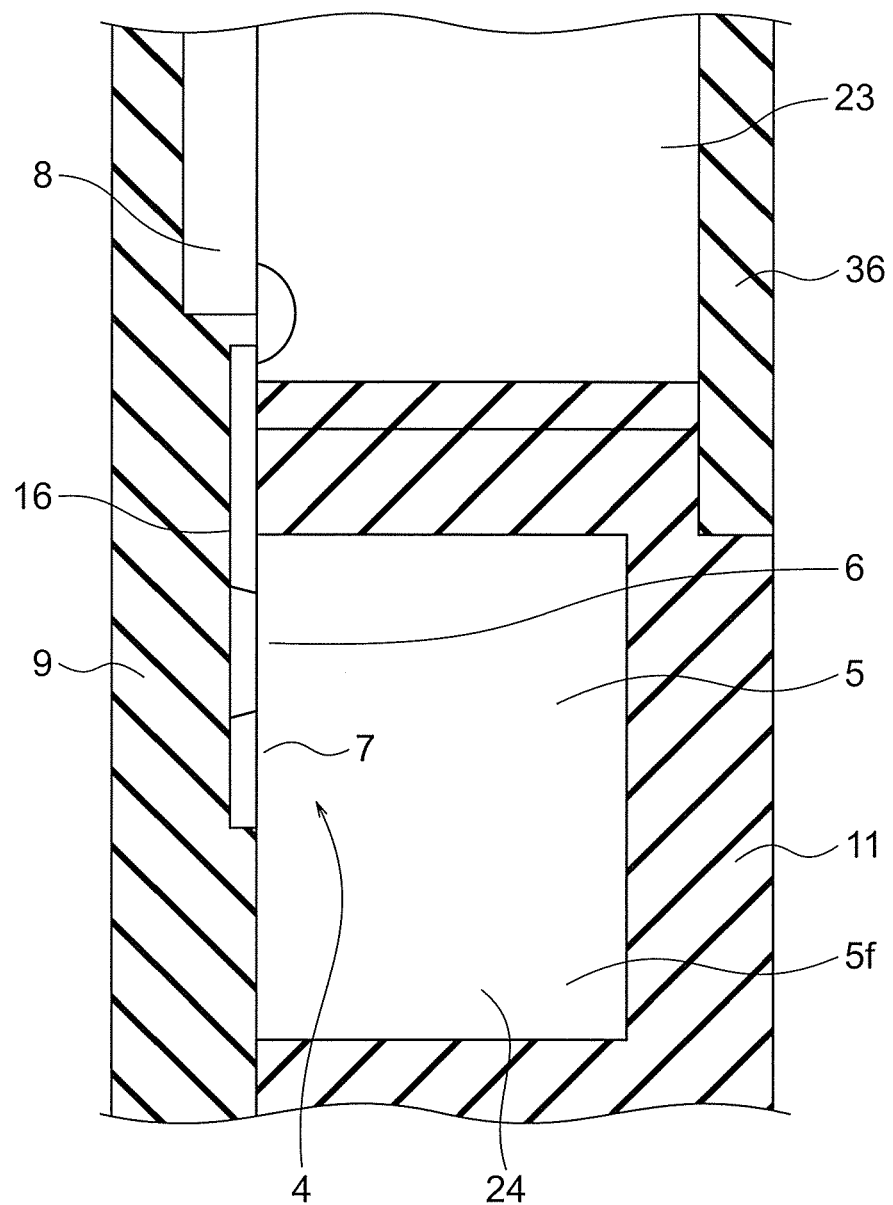
FIG. 4 is a cross sectional view of a principal part perpendicular to the main passage, for illustrating a detection element part of FIG. 1 and a vicinity thereof.

FIG. 4 is a cross sectional view perpendicular to the flow direction of the fluid to be measured in the same main passage 2 as that of FIG. 1, for illustrating a detection element part 4 of FIG. 1 and the vicinity thereof.

Figure 5:
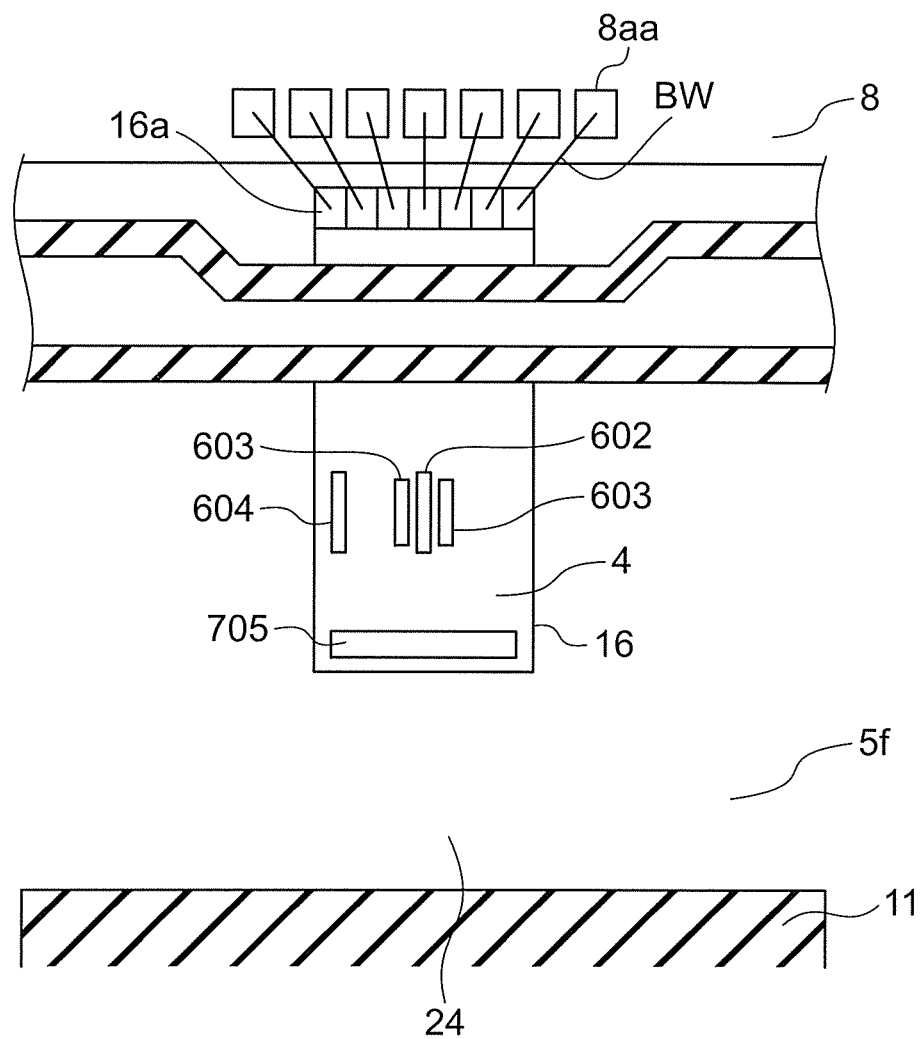
FIG. 5 is a cross sectional view of the principal part parallel to the main passage, for illustrating the detection element part of FIG. 1 and the vicinity thereof.

FIG. 5 is a cross sectional view parallel to the flow direction of the fluid to be measured in the same main passage 2 as that of FIG. 2, for illustrating the detection element part 4 of FIG. 1 and the vicinity thereof. For example, a mainstream of the fluid to be measured flows in a direction indicated by the arrow CD of FIG. 2.

Figure 6:
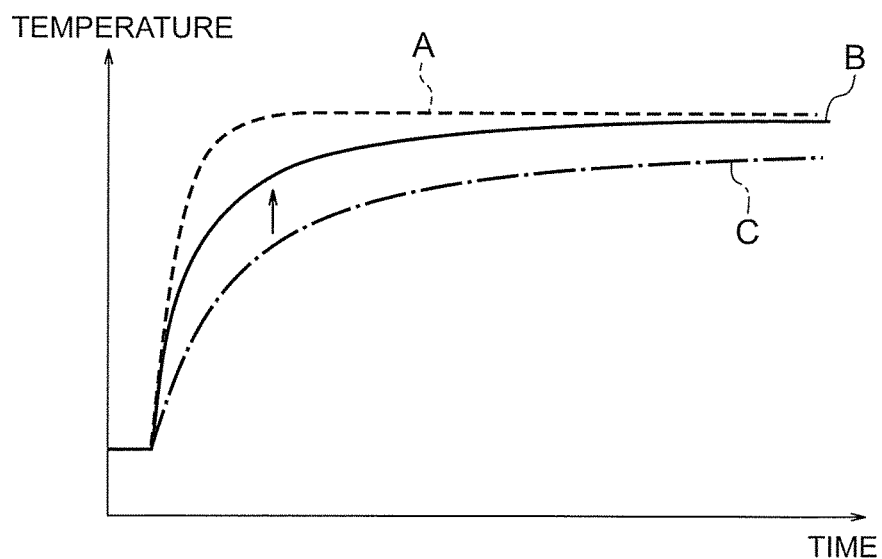
FIG. 6 is a graph for showing a response characteristic of an intake air temperature detection part according to the first embodiment of the present invention.

FIG. 6 is a graph for showing an effect of an improvement in response speed in an intake air temperature detection part 7 of the intake air temperature measurement apparatus 3 according to the first embodiment.

Figure 7:
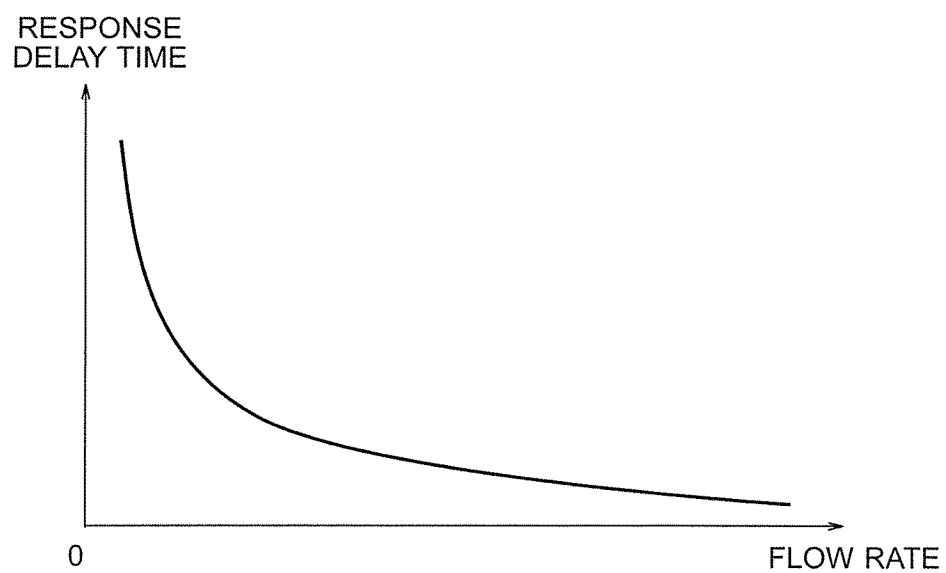
FIG. 7 is a graph for showing response delay time of the intake air temperature detection part according to the first embodiment of the present invention.

FIG. 7 is a graph for showing response delay time of the intake air temperature detection part 7 with respect to a change in the flow rate.

Figure 8:
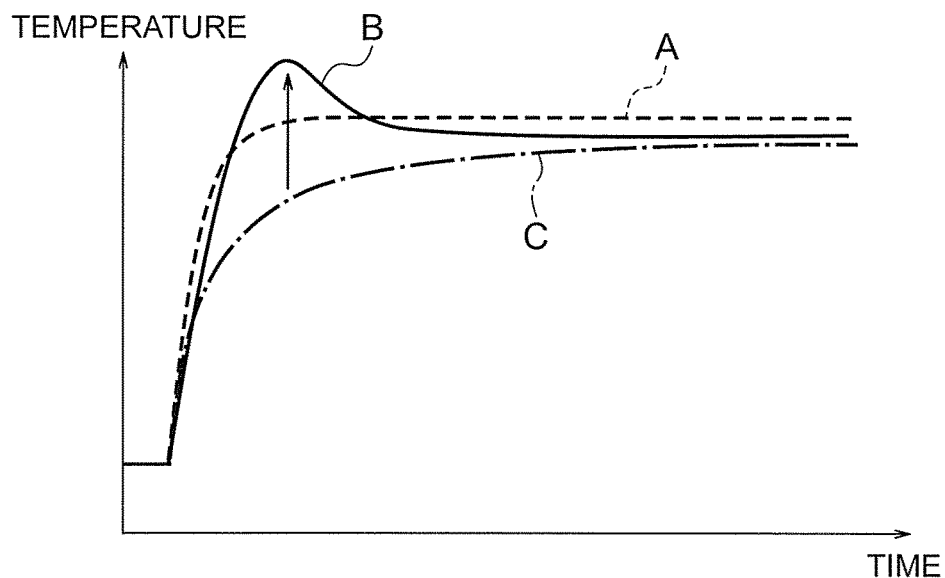
FIG. 8 is a graph for showing the response characteristic of the intake air temperature detection part when a flow rate of FIG. 7 is high.

FIG. 8 is a graph for showing a response characteristic of the intake air temperature detection part 7 when the flow rate is high.

Figure 9:
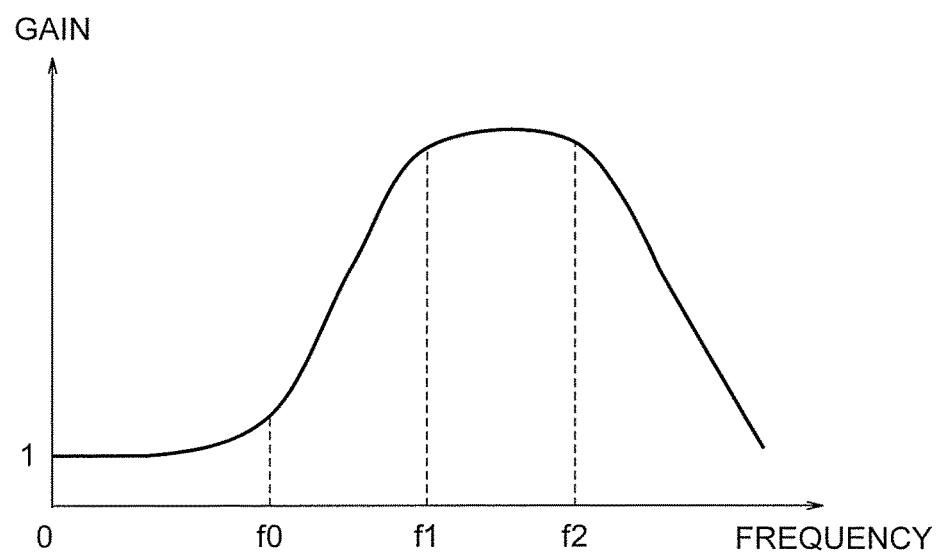
FIG. 9 is a graph for showing a frequency characteristic of a digital filter according to the first embodiment of the present invention.

FIG. 9 is a graph for showing a frequency characteristic of a digital filter.

As illustrated in FIG. 1 and FIG. 2, the flow rate measurement apparatus 1 is installed on the pipe 100, and is used to measure the flow rate and the temperature of the fluid to be measured in the pipe 100. The flow rate measurement apparatus 1 is formed of a main body part 1a on a base 10 side where a flat plate part inserted into the pipe 100 is fixed to the pipe 100, and a measurement passage construction part 1b on a tip portion side inserted into the pipe 100. The main body part 1a extends toward an inside of the main passage 2 through which the fluid to be measured flows, and a circuit accommodation part 23 is formed inside the main body part 1a. A measurement passage 5 for causing a part of the fluid to be measured to flow therethrough is formed in the measurement passage construction part 1b.

A plate 9 serves as a support body extending across the main body part 1a and the measurement passage construction part 1b. The plate 9 supports a circuit board 8 of the circuit accommodation part 23 in the main body part 1a, and supports a substrate 16 having the detection element part 4 mounted thereon and forms a wall surface of the measurement passage 5 in the measurement passage construction part 1b. In a part of the plate 9 forming the wall surface of the measurement passage 5, the detection element part 4 in which the intake air temperature detection part 7 for detecting the temperature of the fluid to be measured and a flow rate detection part 6 for detecting the flow rate of the fluid to be measured are formed on the same main surface of the substrate 16 is arranged.

Moreover, as illustrated in FIG. 1 and FIG. 4, in the main passage 2, a flat surface of the plate 9 serving as the wall surface part of the measurement passage 5 is arranged so as to be parallel to the flow direction of the main passage 2. Moreover, as illustrated in FIG. 1 and FIG. 2, the flow rate measurement apparatus 1 is fixed to the pipe 100 so that the main body part 1a is above the measurement passage construction part 1b.

A detailed description is now given of the flow rate measurement apparatus 1 according to the present invention. In FIG. 1 to FIG. 5, the main passage 2 is an internal passage of the pipe 100, for example, in a cylindrical shape, through which the fluid to be measured passes. For example, in a case of an internal combustion engine for a vehicle, the main passage 2 is generally a flow passage of an intake air pipe formed integrally with an intake air filtering apparatus (not shown). In addition, the fluid to be measured is, for example, formed of a gas such as the air. On a flange part 100a of the pipe 100, an insertion hole 100b for plugging in the flow rate measurement apparatus 1 for measuring the fluid to be measured in the main passage 2 is formed.

The flow rate measurement apparatus 1 includes:

the measurement passage 5 arranged in the main passage 2, for causing a part of the fluid to be measured to flow therethrough;

the detection element part 4 in which the flow rate detection part 6 for detecting the flow rate of the fluid to be measured flowing through the measurement passage 5 and the intake air temperature detection part 7 for measuring the temperature of the fluid to be measured are formed on the same substrate 16;

the circuit board 8 on which a control circuit for driving the flow rate detection part 6 and the intake air temperature detection part 7 to process a flow rate detection signal and an intake air temperature detection signal is formed;

the plate 9 for holding the detection element part 4 and the circuit board 8;

the base 10 for supporting the plate 9;

a measurement passage formation cover 11 arranged at an end of the plate 9 on an opposite side of the base 10 so as to be opposed to the plate 9, for forming the measurement passage 5; and a cover 36 arranged on the base 10 side of the plate 9 so as to be opposed to the plate 9, for forming the circuit accommodation part 23 for accommodating the circuit board 8.

As illustrated in the cross sectional view perpendicular to the flow direction of the fluid to be measured of FIG. 4, and in the cross sectional view parallel to the flow direction of the fluid to be measured of FIG. 5, the detection element part 4 includes the flow rate detection part 6 and the intake air temperature detection part 7.

The flow rate detection part 6 includes a heat generation resistor 602 for detecting the flow rate of the fluid to be measured, generated heat temperature detection resistors 603 respectively arranged on an upstream side and a downstream side of the fluid to be measured of the heat generation resistor 602, and a temperature compensation resistor 604 for detecting the temperature of the fluid to be measured and carrying out temperature compensation for the flow rate detection.

The intake air temperature detection part 7 includes an intake air temperature detection resistor 705 for detecting the temperature of the fluid to be measured.

The flow rate detection part 6 and the intake air temperature detection part 7 are, for example, formed on a surface of the substrate 16 in a rectangular flat plate shape, and input/output terminals 16a electrically connected to the heat generation resistor 602, the generated heat temperature detection resistors 603, the temperature compensation resistor 604, and the intake air temperature detection resistor 705 are formed on one edge of the surface of the substrate 16, and are connected to the circuit board 8 side.

In this case, the heat generation resistor 602, the generated heat temperature detection resistors 603, the temperature compensation resistor 604, the intake air temperature detection resistor 705, and the input/output terminals 16a are formed by patterning a heat sensitive resistor film made of any one of platinum, nickel, iron, nickel alloy, titanium, molybdenum, and the like on the surface of the substrate 16. Moreover, the flow rate detection part 6, which is a formation region for the heat generation resistor 602, the generated heat temperature detection resistors 603, and the temperature compensation resistor 604, may have a diaphragm structure constructed by a cavity formed by removing the substrate 16 from a rear surface side.

Further, as a material for the substrate 16, an electrically insulating material such as silicon or ceramic is used. Note that, the intake air temperature detection part 7, which is a formation region for the intake air temperature detection resistor 705, may have a diaphragm structure constructed by a cavity formed by removing the substrate 16 from the rear surface side in the same way as the flow rate detection part 6. Moreover, the intake air temperature detection part 7 is formed on the same substrate 16 as that for the flow rate detection part 6, but may be formed on a substrate independent of that for the flow rate detection part 6.

Moreover, as illustrated in the circuit diagram of the flow rate measurement apparatus 1 of FIG. 3, the circuit board 8 includes a constant voltage power supply 17, a transistor 18, fixed resistors 19, an operational amplifier 20, and a constant current source 21 as components, and forms an intake air temperature detection circuit part 8a, a heat generation resistor temperature control circuit part 8b, a flow rate detection circuit part 8c, and a circuit board temperature detection circuit part 8d (detailed later), which is an intra-circuit physical amount detection circuit part.

The intake air temperature detection circuit part 8a includes a voltage conversion part 8a1 for supplying a current from the constant current source 21 to the intake air temperature detection resistor 705 of the intake air temperature detection part 7 to convert the current into a voltage, an analog/digital (A/D) conversion part 8a2 for converting a voltage signal from the voltage conversion part 8a1, which is an analog signal, into a binary digital signal, and an intake air temperature signal adjustment part 8a3 for adjusting the digital signal by following a desired output characteristic set in advance.

The flow rate detection circuit part 8c includes a flow rate signal adjustment part 8c1 for adjusting an input voltage by following a desired output characteristic set in advance.

The circuit board temperature detection circuit part 8d includes a circuit board temperature detection part 8d1 for detecting a temperature of the circuit board 8, and a circuit board temperature signal adjustment part 8d2 for adjusting an input signal representing the detected temperature by following a desired output characteristic set in advance.

The plate 9 is made of a plastic material formed into, for example, a rectangular flat plate shape. The circuit accommodation part 23 is formed by bonding the cover 36 in the region corresponding to the circuit board 8 so that the cover 36 faces a surface of the plate 9 on which the circuit board 8 is arranged. Moreover, a detection element accommodation part 24 is formed by bonding the measurement passage formation cover 11, in which the measurement passage 5 (including 5a to 5g) is formed, in the region corresponding to the substrate 16 where the detection element part 4 (including the flow rate detection part 6 and the intake air temperature detection part 7) is particularly arranged so that the measurement passage formation cover 11 faces a surface of the plate 9 on which the substrate 16 is arranged.

In more detail, the substrate 16 is formed so as to extend to the circuit accommodation part 23 side, to thereby enable the connection between the input/output terminals 16a and the circuit board 8.

The circuit board 8 is accommodated in the circuit accommodation part 23, and is fixed by using an adhesive. The substrate 16 having the detection element part 4 mounted thereon is accommodated in the detection element accommodation part 24 so that the input/output terminals 16a are arranged on the circuit board 8 side, and is fixed to the plate 9 by using an adhesive. Note that, the detection element accommodation part 24 is a part of the measurement passage 5, and refers to a region in which the detection element part 4 is arranged. Moreover, the circuit board 8 and the detection element part 4 are arranged on the same surface as the surface (one main surface or an internal surface) of the plate 9.

As illustrated in FIG. 1, the base 10 for fixing the flow rate measurement apparatus 1 to the pipe 100 includes a joint part 10a to be joined to the flange part 100a of the pipe 100 for securing airtightness when the flow rate measurement apparatus 1 is inserted into the main passage 2, a connector part 10b (including insert conductors 10c) arranged inside the joint part 10a, for communicating signals between the circuit board 8 and the outside of the pipe 100, and a coupling part 10d to be coupled to the circuit accommodation part 23, which is arranged from the connector part 10b to the pipe 100 side. The base 10 is integrally molded so that the joint part 10a, the connector part 10b, and the coupling part 10d surround the insert conductors 10c and the like by using a resin such as polybutylene terephthalate.

The circuit accommodation part 23 for accommodating the circuit board 8 is formed so as to be surrounded by the plate 9 and the cover 36. An outer end of the plate 9 is fixed by adhesion to the base 10. The substrate 16 having the detection element part 4 mounted thereon and the circuit board 8 are mounted to the plate 9. The substrate 16 having the detection element part 4 mounted thereon is arranged so as to extend from the detection element accommodation part 24 to the circuit accommodation part 23 side. The input/output terminals 16a of the substrate 16 and input/output terminals 8aa of the circuit board 8 are exposed to the inside of the circuit accommodation part 23, and are electrically connected with each other via bonding wires BW or the like.

Moreover, the measurement passage formation cover 11 for forming the measurement passage 5 together with the plate 9 is formed by a resin such as polybutylene terephthalate. An inner surface of the measurement passage formation cover 11 is fixed to an inner surface of the plate 9 extending from the base 10 by an adhesive or the like. A recessed portion for the measurement passage 5 is formed in the inner surface of the measurement passage formation cover 11. Then, the measurement passage 5 having a passage cross section, for example, in a rectangular shape, is formed by bonding the measurement passage formation cover 11 to the plate 9. Note that, the base 10, the plate 9, and the measurement passage formation cover 11 may be integrally formed by a resin or the like.

As illustrated in FIG. 2, the measurement passage 5 includes a flow inlet 5a, a first passage part 5b, a first bent part 5c, a second passage part 5d, a second bent part 5e, a third passage part 5f in which the detection element part 4 is arranged, a third bent part 5g, a fourth passage part 5h, and a flow outlet part 5i, and is formed into a bent shape. The flow inlet 5a opens in a vicinity of the tip portion of the flow rate measurement apparatus 1 (end opposite to the connector part 10b) toward an upstream side in the flow direction CD of the mainstream of the fluid to be measured, thereby causing the fluid to be measured to flow into the measurement passage 5. The flow outlet 5i opens on a tip portion end surface of the flow rate measurement apparatus 1 in a direction perpendicular or approximately perpendicular to the flow direction CD, thereby causing the fluid to be measured to flow out of the measurement passage 5 to the main passage 2 side. In other words, the end surface of the flow rate measurement apparatus 1 on the tip portion side is a surface parallel or approximately parallel to the flow direction CD.

A more detailed description is now given of the flow in the measurement passage 5. The first passage part 5b is formed so as to extend from the flow inlet 5a to reach the first bent part 5c in the flow direction CD of the mainstream of the fluid to be measured. The second passage part 5d is formed so as to extend from the first bent part 5c to reach the second bent part 5e toward the circuit board 8 in a direction orthogonal or approximately orthogonal to the flow direction CD. The third passage part 5f is formed in a vicinity of the circuit accommodation part 23 so as to extend from the second bent part 5e to reach the third bent part 5g in the flow direction CD. The fourth passage part 5h is formed so as to extend from the third bent part 5g to reach the flow outlet 5i away from the circuit board 8 in the direction orthogonal or approximately orthogonal to the flow direction CD. The first bent part 5c, the second bent part 5e, and the third bent part 5g are formed so as to bend the flow direction of the fluid to be measured at the right angle or an approximately right angle.

Moreover, as illustrated in FIG. 5, the formation region of the heat generation resistor 602, the two generated heat temperature detection resistors 603, and the temperature compensation resistor 604 of the flow rate detection part 6 of the detection element part 4 and the formation region of the intake air temperature detection resistor 705 of the intake air temperature detection part 7 are exposed to the inside of the third passage part 5f of the measurement passage 5.

As illustrated in FIG. 2, each of a plurality of insert conductors 10c is insert-molded in the base 10 so that one end thereof is exposed inside the circuit accommodation part 23, and the other end is exposed inside the connector part 10b. Moreover, as illustrated in FIG. 5, the input/output terminals 16a of the detection element part 4 arranged on the substrate 16 and the input/output terminals 8aa of the circuit board 8 are wire-bonded via the bonding wires BW. Moreover, the input/output terminals 8aa of the circuit board 8 and the one ends of the insert conductors 10c are wire-bonded via the bonding wires BW. Note that, the wire bonding is described as an example of the method of the electrical connection, but an electrical connection method such as welding or soldering may be used.

The resin cover 36 is adhered to the circuit accommodating part 23 by using an adhesive applied to an outer peripheral groove of the circuit accommodating part 23 (more specifically, referring to FIG. 1, FIG. 2, and FIG. 4, respective edge portions of side surface members on both sides of the plate 9 extending in a direction orthogonal to the plate 9, the measurement passage formation cover 11, and the coupling part 10d), to thereby close an opening of the circuit accommodating part 23. Note that, as the method of closing the opening, a description is given of the example of adhesion by using the adhesive, but a method such as welding may be used. Moreover, although not illustrated, sealing gel is generally filled in the circuit accommodating part 23.

This kind of flow rate measurement apparatus 1 is formed of the main body part 1a in which a base part of an extension portion extending from the base 10 is formed of the base 10, the plate 9 including the side surface members, and the cover 36 bonded to the side surface members, and the measurement passage construction part 1b formed by the plate 9 and the measurement passage formation cover 11 bonded to the plate 9. The base part of the extension portion is formed into a rectangular parallelepiped, and the main body part 1a (and the measurement passage construction part 1b) is rectangular in a cross sectional shape orthogonal to the extension direction thereof. Moreover, the main body part 1a and the measurement passage construction part 1b are included in a projection surface of the joint part 10a in the extension direction.

As described above, the main body part 1a and the measurement passage construction part 1b are rectangular in the cross section orthogonal to the extension direction, and one wall surface on one side that is a longer side of a rectangular outer periphery thereof corresponds to a rear surface of the plate 9, and the other wall surface corresponds to an external surface of the cover 36 and the measurement passage formation cover 11.

Further, the flow inlet 5a of the measurement passage 5 is formed on a side surface that is on the shorter side of the rectangular outer periphery of the cross section of the measurement passage constitution part 1b orthogonal to the extension direction, and that is on an upstream side of the main passage 2 in a vicinity of the tip portion of the plate 9. The flow outlet 5i of the measurement passage 5 is formed at a position downstream of the flow inlet 5a of the main passage 2 on the end surface parallel to the flow direction CD of the tip portion of the plate 9.

As illustrated in FIG. 1, the flow rate measurement apparatus 1 is inserted into the insertion hole 100b so that the main body part 1a extends into the main passage 2, and is mounted by fixing the joint part 10a in a flange shape of the base 10 to the flange part 100a of the pipe 100 with screws 38.

The flow rate measurement apparatus 1 is plugged into the main passage 2 so that wall surfaces formed of the longer sides of the rectangular outer periphery of the cross section orthogonal to the extension direction of the main body part 1a (same for the measurement passage construction part 1b) are parallel to or approximately parallel to the flow direction CD of the mainstream of the fluid to be measured flowing through the main passage 2, and one of wall surfaces formed of the shorter sides of the rectangular outer periphery of the cross section of the main body part 1a faces toward the upstream side so as to be orthogonal or approximately orthogonal to the flow direction CD. Then, as illustrated in FIG. 1, an O ring 10e is interposed between the coupling part 10d and the insertion hole 100b, to thereby secure air tightness.

The flow inlet 5a of the measurement passage 5 opens on the surface that is facing toward the upstream side and orthogonal to the flow direction CD of the mainstream, and the flow outlet 5i opens on the surface that is facing downward and parallel to the flow direction CD of the mainstream.

Then, the fluid to be measured flowing through the main passage 2 flows from the flow inlet 5a into the measurement passage 5, flows along the flow direction CD of the mainstream in the first passage part 5*b*, is bent by the approximately right angle in the first bent part 5*c*, and flows in the direction approximately orthogonal to the flow direction CD of the mainstream in the second passage part 5*d*. Then, the flowing direction of the fluid to be measured is bent by the approximately right angle by the second bent part 5*e*, and the fluid to be measured flows in the flow direction CD of the mainstream in the third passage part 5*f*, which is the measurement position, and flows along the surface of the detection element part 4. Then, the flow direction of the fluid to be measured is bent by the approximately right angle by the third bent part 5*g*, and the fluid to be measured flows in the direction approximately orthogonal to the flow direction CD of the mainstream in the fourth passage part 5*h*, and is discharged from the flow outlet 5*i* to the main passage 2.

Then, as illustrated in FIG. 2, an external electric power is supplied from the connector part 10*b* via the insert conductors 10*c* to the control circuit constructed on the circuit board 8. As illustrated in FIG. 3, this control circuit is formed of the intake air temperature detection circuit part 8*a*, the heat generation resistor temperature control circuit part 8*b*, the flow rate detection circuit part 8*c*, and the circuit board temperature detection circuit part 8*d*.

As illustrated in FIG. 3, in the intake air temperature detection circuit part 8*a*, the voltage conversion part 8*a*1 supplies the current from the constant current source 21 to the intake air temperature detection resistor 705 that is arranged on the intake air temperature detection part 7 of the detection element part 4, and changes its resistance value depending on the temperature, to thereby detect a voltage signal corresponding to the temperature.

The A/D conversion part 8*a*2 converts the voltage signal detected by the voltage conversion part 8*a*1 into the binary digital signal.

The intake air temperature signal adjustment part 8*a*3 uses a digital filter DF to carry out the phase lead processing, carries out temperature difference correction processing based on a temperature difference between the temperature of the circuit board 8 notified from the circuit board temperature detection circuit part 8*d* and the intake air temperature notified from the A/D conversion part 8*a*2, then adjusts the intake air temperature signal so as to have the predetermined characteristic, and outputs the intake air temperature signal as an intake air temperature signal IAT from the output terminal. The digital filter DF changes its filter constants depending on a signal detected by the flow rate detection circuit 8*c*, and further includes a low-pass filter LPF function for attenuating a signal at a high frequency.

Figure 17:
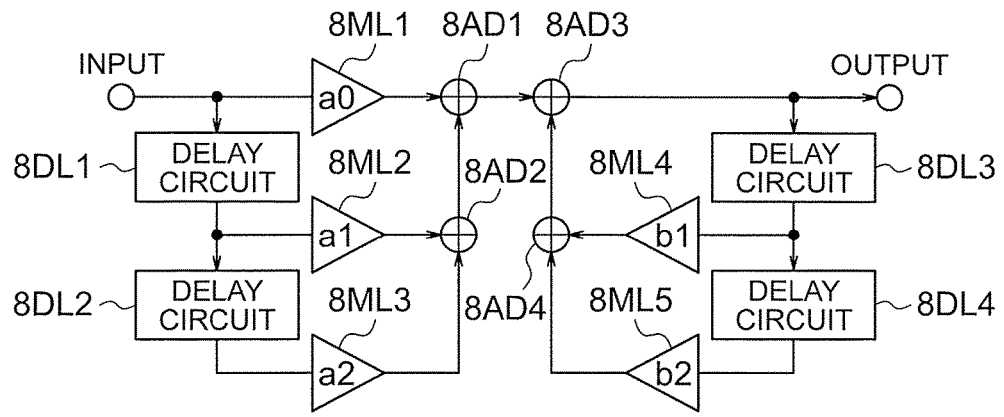
FIG. 17 is a diagram for illustrating an example of a configuration of a recursive digital filter for carrying out phase lead processing by a digital filter in the physical amount measurement apparatus according to the present invention.

Then, as illustrated in FIG. 17, the phase lead processing by the digital filter DF can be realized by a recursive digital filter having a configuration of an infinite impulse response filter using multipliers 8ML1 to 8ML5, adders 8AD1 to 8AD4, and delay circuits 8DL1 to 8DL4.

In the recursive digital filter of FIG. 17, generally, input signals are delayed in the delay circuits 8DL1 to 8DL4, then multiplied by respective coefficients in the multipliers 8ML1 to 8ML5, and added to one another in the adders 8AD1 to 8AD4, to thereby output the sum.

Frequencies f0, f1, and f2 of FIG. 9 can be determined by values of coefficients a0, a1, a2, b1, and b2 of the multipliers 8ML1 to 8ML5, which are filter constants shown in FIG. 17.

Further, an optimal frequency characteristic of the digital filter DF having the low-pass filter function of attenuating a signal at a high frequency can be acquired by changing the values of the filter constants a0, a1, a2, b1, and b2 based on a flow rate signal FLA to change the frequencies f0, f1, and f2 of FIG. 9. A description is given above of the recursive digital filter having the configuration of the infinite impulse response filter, but the recursive digital filter may be formed of a finite impulse response filter.

The heat generation resistor temperature control circuit part 8*b* forms a bridge circuit by using the heat generation resistor 602 and the temperature compensation resistor 604 arranged on the flow rate detection part 6 of the detection element part 4 and the fixed resistors 19 of the circuit board 8. Then, a differential signal of the bridge circuit is detected by the operational amplifier 20. Then, feedback control is carried out so that the generated heat temperature is constant by supplying a current from the constant voltage power supply 17 to the bridge circuit via the transistor 18 controlled by the differential signal.

The flow rate detection circuit part 8*c* forms a bridge circuit by using the two generated heat temperature detection resistors 603 that are respectively arranged upstream and downstream of the flow direction CD of the mainstream of the heat generation resistor 602 arranged on the flow rate detection part 6 of the detection element part 4, and change their resistance values depending on the influence of the heat of the heat generation resistor 602, the fixed resistors 19 of the circuit board 8, and the constant voltage power supply 17 (heat generation resistor type flowmeter). Then, a differential signal corresponding to the flow rate is detected by the bridge circuit. The detected differential signal is supplied to the flow rate signal adjustment part 8*c*1. Then, the differential signal is adjusted by the flow rate signal adjustment part 8*c*1 to have the characteristic set in advance, and is output as the flow rate signal (FLA) from the output terminal.

Moreover, the flow rate signal adjustment part 8*c*1 carries out the intake air temperature correction on the flow rate signal (FLA) based on the intake air temperature signal (IAT) from the intake air temperature signal adjustment part 8*a*3 of the intake air temperature detection circuit part 8*a*.

Note that, if the flow rate signal adjustment part 8*c*1 is formed of a digital circuit as in the intake air temperature signal adjustment part 8*a*3, A/D conversion is first applied to the input signal. When the flow rate signal adjustment part 8*c*1 is formed of an analog circuit, the signal after A/D conversion is transmitted to the intake air temperature signal adjustment part 8*a*3.

In the circuit board temperature detection circuit part 8*d*, the circuit board temperature detection part 8*d*1 supplies a current from the constant current source 21 to the circuit board temperature detection resistor 801 arranged on the circuit board 8, which changes its resistance value depending on the temperature, and converts the current into a voltage, thereby acquiring the voltage signal.

The circuit board temperature signal adjustment part 8*d*2 adjusts the supplied voltage signal so as to have the characteristic set in advance, and outputs the adjusted voltage signal to the intake air temperature detection circuit part 8*a* as a circuit board temperature signal CBT.

Note that, if the circuit board temperature signal adjustment part 8*d*2 is formed of a digital circuit as in the intake air temperature signal adjustment part 8*a*3, A/D conversion is first applied to the input signal. When the circuit board temperature signal adjustment part 8*d*2 is formed of an analog circuit, the signal after A/D conversion is transmitted to the intake air temperature signal adjustment part 8*a*3.

The intake air temperature signal adjustment part 8*a*3 of the intake air temperature detection circuit part 8*a* compares the circuit board temperature signal CBT and the intake air temperature signal IAT with each other, and, when a temperature difference occurs, corrects the intake air temperature signal IAT.

For example, the correction is realized by amplifying the difference between the intake air temperature signal (IAT) and the circuit board temperature signal (CBT) by a differential amplifier, converting the amplified signal into a digital signal by means of A/D conversion, multiplying the digital signal by a coefficient by a multiplier, and adding the multiplied signal to the intake air temperature signal to which the phase lead processing has been applied by an adder.

Note that, the circuit board temperature detection part 8*d*1 is formed by supplying the current from the constant current source 21 to the circuit board temperature detection resistor 801, but may be formed by short-circuiting between the base and the collector of a transistor, supplying a current from the constant current source to the collector of the transistor, and supplying a voltage between the base and the emitter of the transistor to the circuit board temperature signal adjustment part 8*d*2.

FIG. 6 is a graph for showing a response characteristic of the intake air temperature detection circuit part 8*a* of the flow rate measurement apparatus 1 according to the first embodiment of the present invention, and shows a change in the temperature detected by the intake air temperature detection part 7 caused by a change in the temperature of the fluid to be measured.

The change in the detected temperature is caused in a case where a vehicle is put into a warmed up garage from an environment having a low atmospheric temperature, and the intake air temperature rapidly increases from the low temperature or a case where an engine hood of a vehicle is closed from an open state, hot air in an engine room is taken as the intake air, and the intake air rapidly increases. Moreover, in a case where an engine is warmed up in an idling operation state, and the vehicle is rapidly accelerated after the temperature in the engine room has risen, the intake air temperature rapidly decreases from a high temperature.

The broken line A of FIG. 6 represents the temperature in the main passage 2 when the temperature of the fluid to be measured changes, and represents a waveform to be measured in the measurement passage 5, namely, a temporal change in the temperature. The solid line B represents data (intake air temperature signal (IAT) acquired by the intake air temperature measurement apparatus 3 according to the present invention including the phase lead correction function for the intake air temperature signal (ITA) and the temperature difference correction function between the intake air temperature (IAT) and the circuit board temperature (CBT) by the digital filter DF in the intake air temperature signal adjustment part 8*a*3. The long dashed short dashed line C represents a comparative data (intake air temperature signal) when the phase lead correction and the temperature difference correction between the intake air temperature (IAT) and the circuit board temperature (CBT) are not carried out by the digital filter DF.

The long dashed short dashed line C represents a state in which time until an equilibrium state is reached is longer than those of the broken line A and the solid line B, and the equilibrium temperature is the lowest. In other words, the intake air temperature measurement apparatus 3 that uses the digital filter DF to carry out the phase lead correction on the intake air temperature signal and the temperature difference correction between the intake air temperature and the circuit board temperature according to the present invention can provide data closer to the actual temperature change in the fluid to be measured.

As shown by the long dashed short dashed line C of FIG. 6, in the flow rate measurement apparatus in which the phase lead is not applied to the intake air temperature signal by the digital filter DF, the temperature in the measurement passage 5 increases more slowly than the temperature in the main passage 2. This is because the inside of the measurement passage 5 formed by molding has such a large heat capacity as to cause a response delay with respect to the temperature change in the fluid to be measured in the main passage 2, and the correct intake air temperature cannot be detected. Moreover, if the temperature outside the pipe 100 is lower than the temperature in the main passage 2, even when the temperature change reaches the equilibrium, the temperature in the measurement passage 5 is lower than that in the main passage 2. This is because the conduction of the heat from the outside of the pipe 100 to the connector part 10*b* and the measurement passage 5 affects the measurement passage 5.

For example, even if the heat capacity of the intake air temperature detection part 7 of the substrate 16 is decreased, for example, by employing the diaphragm structure for the substrate portion of the intake air temperature detection part 7 of the substrate 16 in order to increase the response speed to the temperature change in the intake air temperature detection part 7, an error occurs in the temperature in the measurement flow passage 5, and the correct intake air temperature cannot be detected.

According to the first embodiment, the digital filter DF of the intake air temperature signal adjustment part 8*a*3 of the intake air temperature detection circuit part 8*a* can apply the phase lead processing to the signal from the intake air temperature detection part 7. As a result of this configuration, as shown by the solid line B of FIG. 6, the measurement error in the intake air temperature signal output from the intake air temperature detection circuit part 8*a* with respect to temperature in the main passage 2, which is the true value, is reduced, and the response speed to the temperature change in the fluid to be measured can be increased. Moreover, the phase lead processing by the digital filter DF eliminates necessity of a high capacity capacitor required for an analog filter, and reduction in size and cost can be easily realized. Further, by comparing the circuit board temperature and the intake air temperature with each other, and correcting the intake air temperature signal when the temperature difference occurs, the temperature at the equilibrium can be made closer to the temperature in the main passage 2.

FIG. 7 is a graph for showing response delay time of the intake air temperature detection part 7 in the measurement passage 5 with respect to the flow rate when the temperature of the fluid to be measured changes. FIG. 8 is a graph similar to FIG. 6, for showing a response characteristic of the intake air temperature detection circuit part 8*a* of the flow rate measurement apparatus 1 according to the first embodiment of the present invention when the flow rate is more than that of FIG. 6.

As illustrated in FIG. 8, when the flow rate is high, heat conductivity increases to reduce the response delay of the intake air temperature in the measurement passage 5, and hence, as shown by a peak indicated by the arrow of the solid line B, the phase lead correction may become excessive, resulting in a degradation in the measurement precision.

In this case, precise response correction can be made to the intake air temperature change without degradation in the intake air temperature measurement precision by adding a function of changing the filter constants for each flow rate or based on the flow rate to the digital filter DF.

For example, the filter constants are changed based, for example, on the flow rate signal (FLA) from the flow rate detection circuit part 8c.

Further, as shown in FIG. 7, when the flow rate is high, the response delay time of the intake air temperature detection part 7 decreases, and required measurement precision can be secured without the phase lead correction. In this case, a data storage amount for the filter constants can be reduced to achieve further reduction in cost by stopping the phase lead correction function of the digital filter DF at a flow rate equal to or more than a flow rate that does not require the phase lead correction depending on the flow rate signal (FLA).

Moreover, as shown by the frequency characteristic of the digital filter shown in FIG. 9, a noise signal at a high frequency amplified by the phase lead correction can be attenuated by adding a low-pass filter function, to thereby increase noise tolerance and achieve highly precise intake air temperature measurement. A peak portion of the gain of FIG. 9 corresponds to a low frequency region, and a right side of the peak corresponds to a high frequency region.

Note that, independently of the digital filter DF, a low-pass filter LPF may be arranged, which is realized by a finite impulse response filter or an infinite impulse response filter formed of multipliers, adders, and delay circuits.

Further, as illustrated in FIG. 3, the flow rate signal adjustment part 8c1 can realize highly precise flow rate measurement by using the highly precise intake air temperature information notified from the intake air temperature signal adjustment part 8a3 to correct the characteristic change in the flow rate signal (FLA) caused by the intake air temperature.

Second Embodiment

Referring to FIG. 10 to FIG. 14, a description is now given of a physical amount measurement apparatus mounted integrally with a flow rate measurement apparatus according to a second embodiment of the present invention. The overall configuration of the flow rate measurement apparatus including the physical amount measurement apparatus is basically the same as that illustrated in FIG. 1 and FIG. 2. In the following description, for example, the fluid to be measured is intake air, and the physical amount is a relative humidity and a temperature of the intake air for acquiring an absolute humidity of the intake air.

Figure 10:
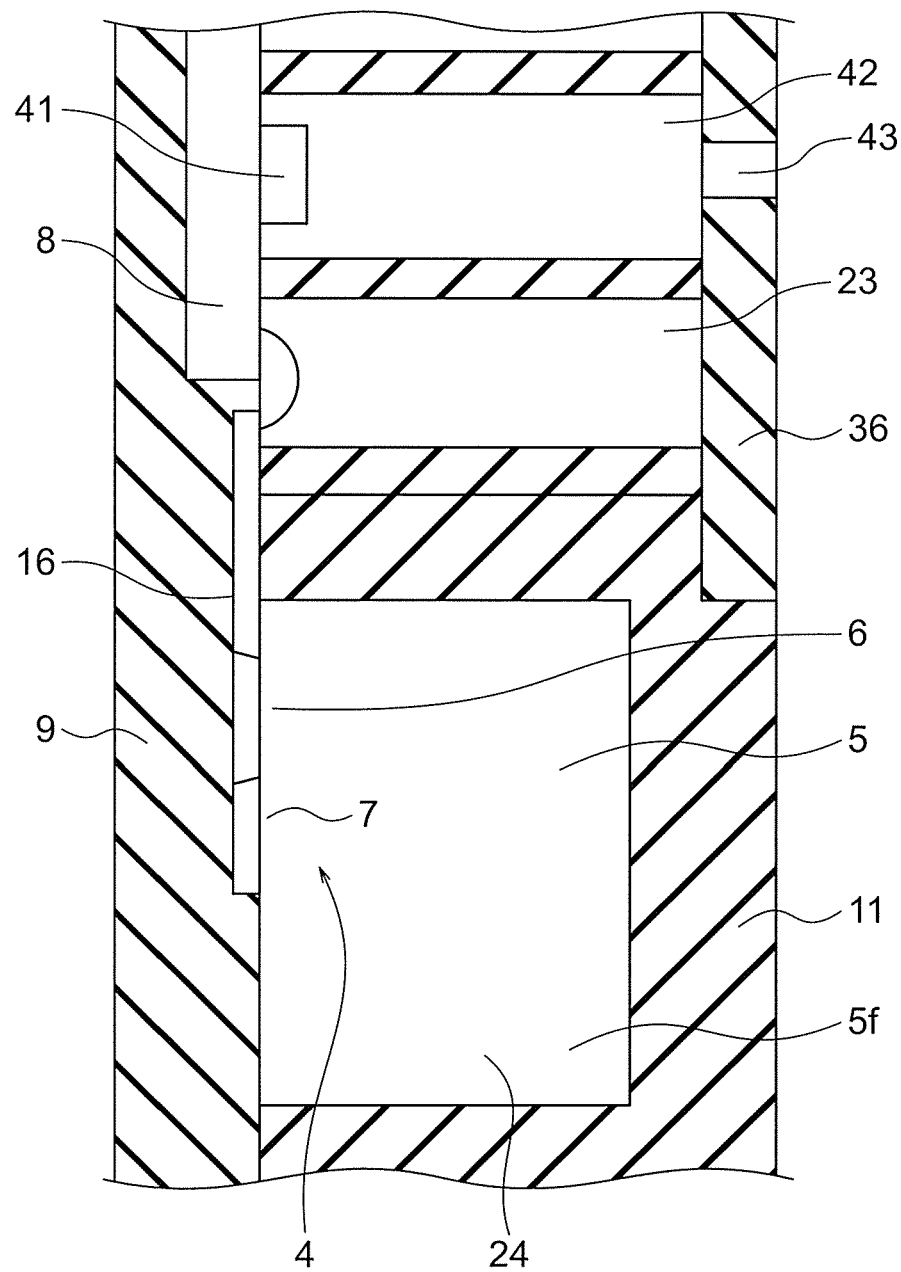
FIG. 10 is a cross sectional view perpendicular to a main passage, for illustrating a detection element part and a vicinity thereof according to a second embodiment of the present invention.

FIG. 10 is a cross sectional view perpendicular to a flow direction of the fluid to be measured in the main passage 2 that is the same as that of FIG. 1, for illustrating a detection element part 4 and a vicinity thereof according to the second embodiment.

Figure 11:
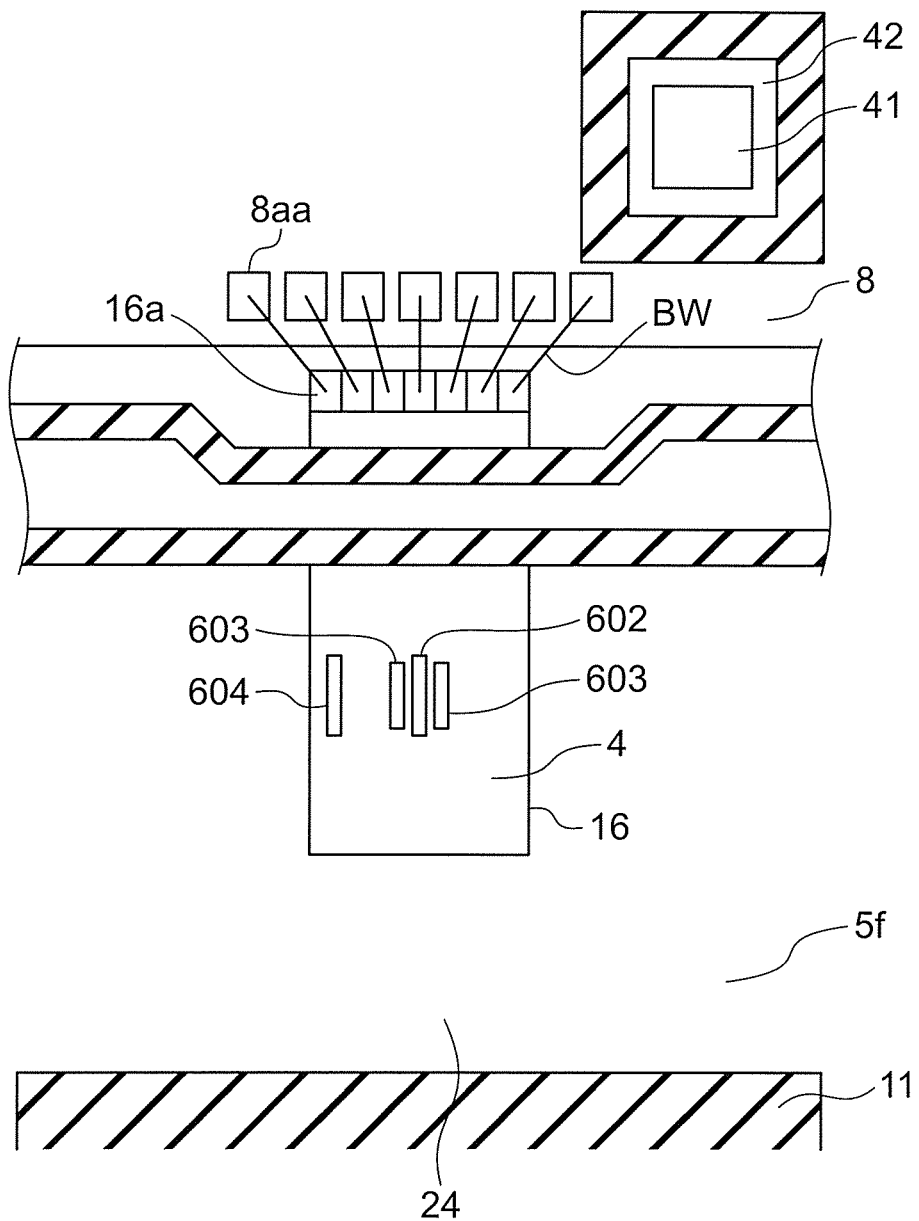
FIG. 11 is a cross sectional view parallel to the main passage, for illustrating the detection element part and the vicinity thereof according to the second embodiment of the present invention.

FIG. 11 is a cross sectional view parallel to the flow direction of the fluid to be measured in the main passage 2 that is the same as that of FIG. 2, for illustrating the detection element part 4 and the vicinity thereof according to the second embodiment.

Figure 12:
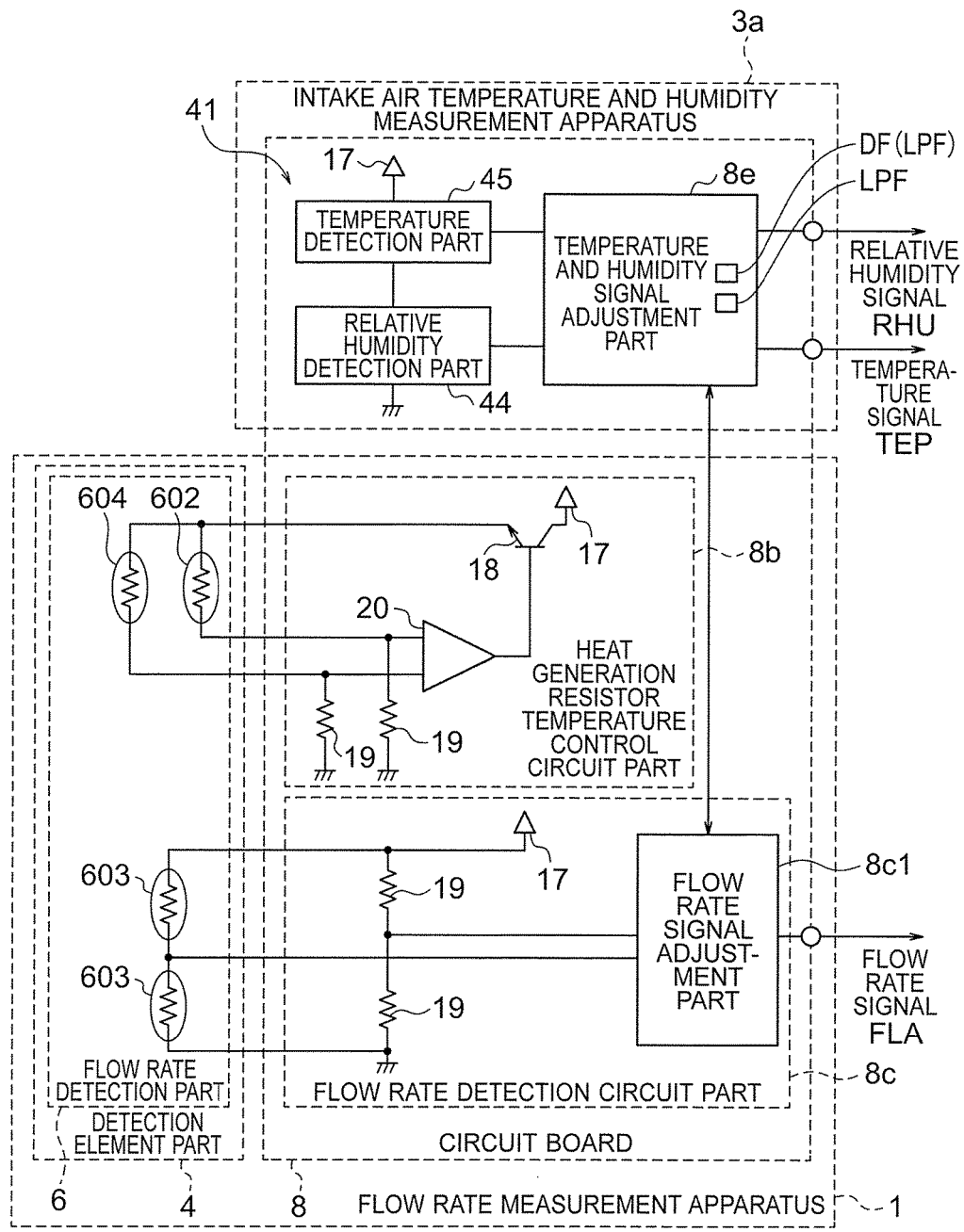
FIG. 12 is a circuit diagram for illustrating a schematic configuration of a flow rate measurement apparatus including a physical amount measurement apparatus according to the second embodiment of the present invention.

FIG. 12 is a circuit diagram for illustrating a schematic configuration of a detection part of the flow rate measurement apparatus 1 integrally including an intake air temperature and humidity measurement apparatus 3a, which is the physical amount measurement apparatus, according to the second embodiment.

Figure 13:
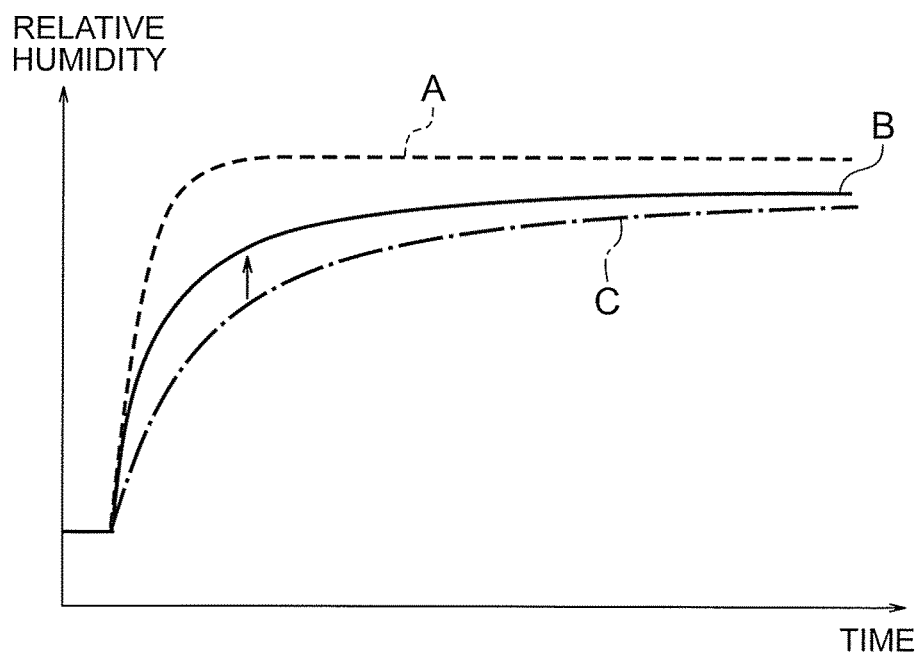
FIG. 13 is a graph for showing a response characteristic of a relative humidity detection part according to the second embodiment of the present invention.

FIG. 13 is a graph for showing an effect of an improvement in response speed of a relative humidity detection part 44 according to the second embodiment.

Figure 14:
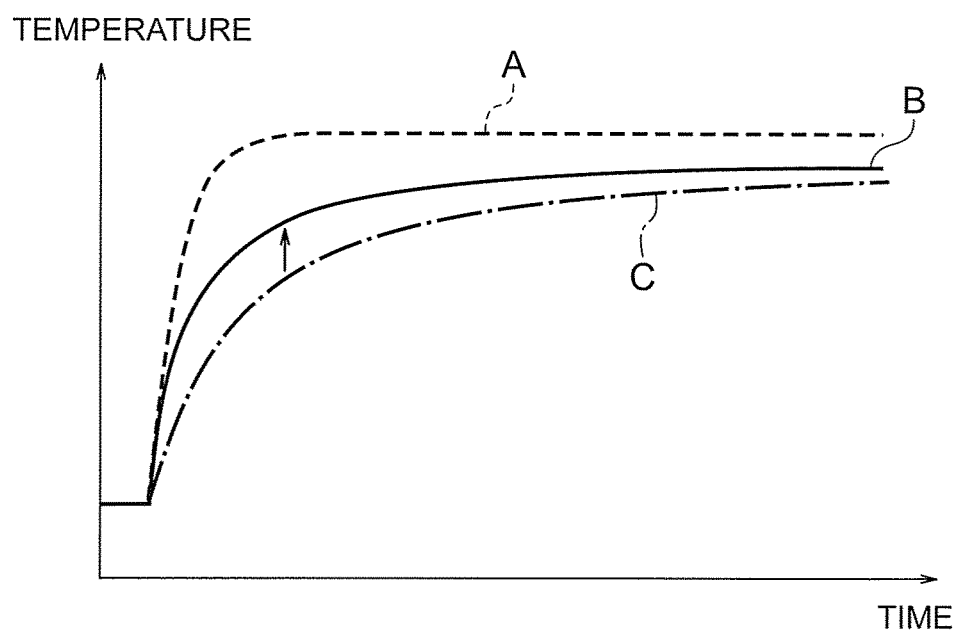
FIG. 14 is a graph for showing a response characteristic of a temperature detection part according to the second embodiment of the present invention.

FIG. 14 is a graph for showing an effect of an improvement in response speed of a temperature detection part 45 according to the second embodiment.

As illustrated in FIG. 10 and FIG. 11, the temperature and humidity measurement apparatus serving as the physical amount detection part is mounted by soldering to a wire bonding pad surface on the circuit board 8. Other electronic components are mounted by soldering on the same surface or on an opposite surface of the wire bonding pad on the circuit board 8.

The temperature and humidity measurement apparatus is arranged in a measurement chamber 42 partitioned by the side surface members of the circuit accommodating part 23 formed of the circuit board 8 and the cover 36. The temperature and humidity measurement apparatus is the only electronic component in the measurement chamber. The circuit board 8 is adhered to the base 10 and the cover 36, the cover 36 is adhered to the measurement passage formation cover 11, the coupling part 10d of the base 10, and the like, and such a structure that the electronic components on the circuit board 8 except for the temperature and humidity measurement apparatus are separated from the main passage 2 is employed. A communication opening 43, which is open on a surface extending in parallel to the direction of the flow of the intake air passing through the main passage 2, is formed on the cover 36, and the measurement chamber 42 and the main passage 2 communicate with each other via the communication opening 43. Moreover, a coupling part between the temperature and humidity measurement apparatus exposed to the external air and the circuit board 8 is coated with a coating agent. The other configuration is the same as that of the first embodiment.

The temperature and humidity measurement apparatus is used to measure the absolute humidity of the intake air, and measures the relative humidity and the temperature at a location where the relative humidity is measured, thereby calculating the absolute humidity. When contaminants such as water and oil directly adhere to a detection part of the temperature and humidity measurement apparatus, measurement precision degrades, and the measurement cannot be carried out in the worst case. Therefore, the humidity and temperature measurement apparatus needs to be arranged in the measurement chamber 42 into which foreign matters (contaminants) are not likely to enter as illustrated in FIG. 10. However, though the foreign matters are not likely to enter, the air on the main passage 2 side is also not likely to enter, and such a problem that measurement precision of the relative humidity and the temperature degrades exists.

For example, when a vehicle is traveling, and enters into a highly humid environment in a tunnel, the absolute humidity rapidly increases. Conversely, when the vehicle exits the tunnel, the absolute humidity rapidly decreases.

FIG. 12 is a circuit diagram for illustrating a schematic configuration of the detection part according to the second embodiment of the present invention. As illustrated in FIG. 12, the temperature and humidity measurement apparatus of the intake air temperature and humidity measurement apparatus (physical amount measurement apparatus) 3a is constructed of a relative humidity detection part 44 and a temperature detection part 45. The relative humidity detection part 44 of the temperature and humidity measurement apparatus detects the relative humidity, the phase lead processing is applied to a detection signal by the digital filter DF of a temperature and humidity signal adjustment part 8e constructing a temperature and humidity detection circuit part, and the detection signal is adjusted to have a predetermined characteristic, and is output as an intake air relative humidity signal (RHU) from the output terminal.

Moreover, the temperature detection part 45 of the temperature and humidity measurement apparatus detects the temperature, the phase lead processing is applied to a detection signal by the digital filter DF of the temperature and humidity signal adjustment part 8e, and the detection signal is adjusted to have a predetermined characteristic, and is output as a detected intake air temperature signal (TEP) from the output terminal. For example, the phase lead processing is configured by the recursive digital filter illustrated in FIG. 17.

The other configurations and operations are the same or correspond to those of the first embodiment.

FIG. 13 is a graph for showing a response characteristic of the relative humidity detection part 44 of the temperature and humidity measurement apparatus according to the second embodiment of the present invention, and shows a change in the relative humidity detected by the relative humidity detection part 44 caused by a change in the relative humidity of the fluid to be measured.

The broken line A of FIG. 13 represents the relative humidity in the main passage 2 when the relative humidity of the fluid to be measured changes, and represents a waveform to be measured in the measurement chamber 42, namely, a temporal change in the relative humidity. The solid line B represents data (intake air relative humidity signal (RHU)) acquired by the intake air temperature and humidity measurement apparatus 3a having the phase lead correction function for the relative humidity signal by the digital filter DF in the temperature and humidity signal adjustment part 8e. The long dashed short dashed line C represents comparative data (relative humidity signal) obtained when the phase lead correction is not carried out by the digital filter DF.

The long dashed short dashed line C represents a state in which the time until the equilibrium is reached is longer than those of the broken line A and the solid line B. In other words, the intake air temperature and humidity measurement apparatus 3a according to the present invention that uses the digital filter DF to carry out the phase lead correction on the relative humidity signal can provide data close to the actual humidity change in the fluid to be measured.

FIG. 14 is a graph for showing a response characteristic of the temperature detection part 45 of the temperature and humidity measurement apparatus, and shows a change in the temperature detected by the temperature detection part 45 caused by a change in the temperature of the fluid to be measured.

The broken line A of FIG. 14 represents the temperature in the main passage 2 when the temperature of the fluid to be measured changes, and represents a waveform to be measured in the measurement chamber 42, namely, a temporal change in the temperature. The solid line B represents data (detected intake air temperature signal (TEP)) acquired by the intake air temperature and humidity measurement apparatus 3a having the phase lead correction function for the temperature signal by the digital filter DF in the temperature and humidity signal adjustment part 8e. The long dashed short dashed line C represents comparative data (temperature signal) obtained when the phase lead correction is not carried out by the digital filter.

The long dashed short dashed line C represents a state in which the time until the equilibrium is reached is longer than those of the broken line A and the solid line B. In other words, the intake air temperature and humidity measurement apparatus 3a according to the present invention that uses the digital filter DF to carry out the phase lead correction on the temperature signal can provide data close to the actual temperature change in the fluid to be measured.

A description has been given of the temperature and humidity measurement apparatus, but the same effect can be provided by any measurement apparatus for measuring a physical amount.

Third Embodiment

Figure 15:
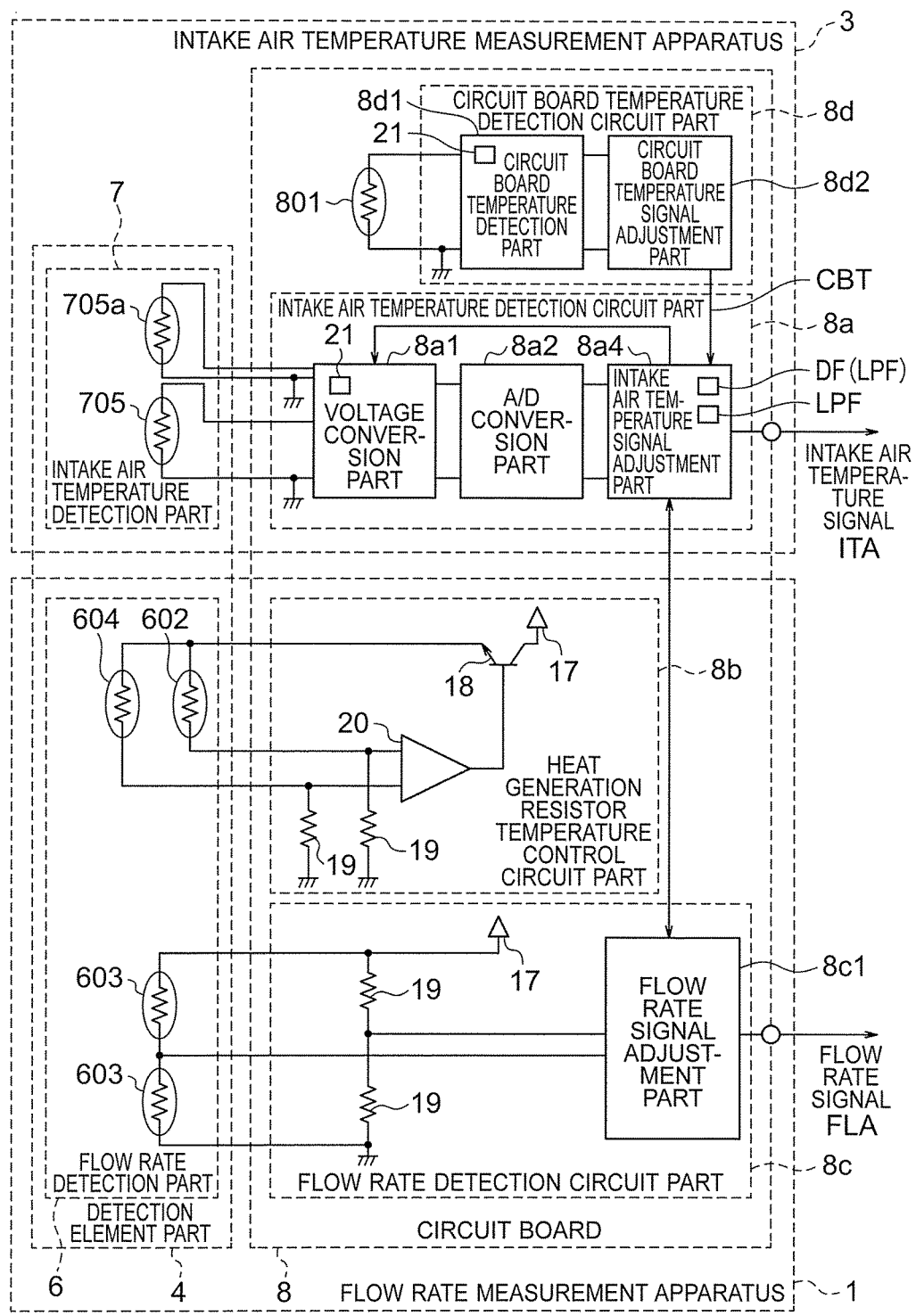
FIG. 15 is a circuit diagram for illustrating a schematic configuration of a flow rate measurement apparatus including a physical amount measurement apparatus according to a third embodiment of the present invention.
Figure 16:
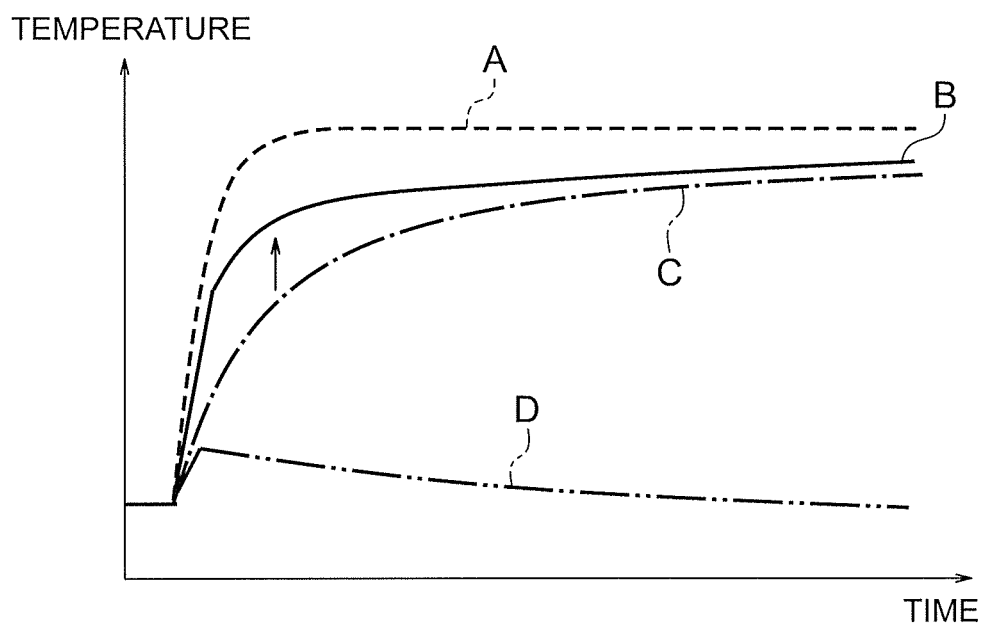
FIG. 16 is a graph for showing a response characteristic of an intake air temperature detection part according to the third embodiment of the present invention.

Referring to FIG. 15 and FIG. 16, a description is now given of a physical amount measurement apparatus mounted integrally with a flow rate measurement apparatus according to a third embodiment of the present invention. In the following description, for example, the fluid to be measured is intake air, and the physical amount is the temperature of the intake air.

FIG. 15 is a circuit diagram for illustrating a schematic configuration of a detection part of a flow rate measurement apparatus 1 integrally including an intake air temperature measurement apparatus (physical amount measurement apparatus) 3 according to the third embodiment.

FIG. 16 is a graph for showing an effect of an improvement in response speed of the intake air temperature detection part 7 of the intake air temperature measurement apparatus 3 according to the third embodiment.

As illustrated in FIG. 15, in the intake air temperature detection circuit part 8a, the voltage conversion part 8a1 for supplying the current from the constant current source 21 to the intake air temperature detection resistor 705 arranged on the intake air temperature detection part 7 of the detection element part 4, which changes its resistance value depending on the temperature, and converting the current into the voltage signal is formed. Then, the voltage conversion part 8a1 detects the voltage signal corresponding to the temperature, and the detected voltage signal is converted into the digital signal by the A/D conversion part 8a2.

An intake air temperature signal adjustment part 8a4 has a function of carrying out the phase lead processing by the digital filter DF, carrying out the temperature difference correction processing based on the temperature difference between the temperature of the circuit board 8 from the circuit board temperature detection circuit part 8d and the intake air temperature from the A/D conversion part 8a2, and then adjusting the intake air temperature signal so as to have the predetermined characteristic to be output as the intake air temperature signal IAT from the output terminal.

Moreover, the intake air temperature signal adjustment part 8a4 further has a function of outputting a signal acquired by differentiating the intake air temperature signal ITA and multiplying the derivative by a coefficient to the voltage conversion part 8a1. The voltage conversion part 8a1 changes a current value supplied to the intake air temperature detection part 7 depending on the signal acquired by differentiating the intake air temperature signal from the intake air temperature signal adjustment part 8a4 and multiplying the derivative by the coefficient. A description is given above of the case in which the intake air temperature detection part 7 is constructed only of the intake air temperature detection resistor 705, but an intake air temperature detection resistor 705a may be formed as a transient state detection circuit element independent of the intake air temperature detection resistor 705, to thereby carry out the phase correction for the intake air temperature signal.

FIG. 16 is a graph for showing a response characteristic of the intake air temperature detection part 7 of the intake air temperature measurement apparatus 3 according to the third embodiment, and shows a change in the temperature detected by the intake air temperature detection part 7 caused by a change in the temperature of the fluid to be measured.

The broken line A of FIG. 16 represents the temperature in the main passage 2 when the temperature of the fluid to be measured changes, and represents a waveform to be measured in the measurement passage 5, namely, a temporal change in the temperature.

The solid line B represents data (intake air temperature (IAT)) acquired by the intake air temperature measurement apparatus 3 according to the present invention having the current phase lead correction function of supplying the current value acquired by differentiating the signal from the intake air temperature detection part 7 or the intake air temperature signal ITA acquired by the intake air temperature signal adjustment part 8a4 and multiplying the derivative by the coefficient to the intake air temperature detection part 7, and the temperature difference correction function between the intake air temperature (IAT) and the circuit board temperature (CBT).

The long dashed double-short dashed line D is data representing a signal acquired by differentiating the signal from the intake air temperature detection part 7.

The long dashed short dashed line C represents comparative data obtained when the phase lead correction and the temperature difference correction are not carried out. The long dashed short dashed line C represents a state in which time until the equilibrium is reached is longer than those of the broken line A and the solid line B. In other words, the intake air temperature measurement apparatus 3 according to the present invention that carries out the phase lead correction on the intake air temperature signal by changing the current supplied to the intake air temperature detection part 7 depending on the transient state can provide data close to an actual temperature change in the fluid to be measured.

As shown by the long dashed short dashed line C of FIG. 16, in the intake air temperature measurement apparatus in which the phase lead correction is not applied to the intake air temperature signal, the temperature in the measurement passage 5 increases more gradually than the temperature in the main passage 2. This is because the inside of the measurement passage 5 formed by molding has such a large heat capacity as to cause a response delay with respect to the temperature change in the fluid to be measured in the main passage 2, and the correct intake air temperature cannot be detected.

According to the third embodiment, the phase lead processing can be carried out by adding the current value acquired by the intake air temperature signal adjustment part 8a4 of the intake air temperature detection circuit part 8a differentiating the signal from the intake air temperature detection part 7 and multiplying the derivative by the coefficient to the constant current value of the voltage conversion part 8a1 supplied to the intake air temperature detection part 7. Moreover, the coefficient can be changed depending on the flow rate signal FLA from the flow rate signal adjustment part 8c1 of the flow rate measurement apparatus 1 so that the phase lead correction amount is an optimal value for each flow rate. For example, the intake air temperature detection circuit part 8a is constructed of a circuit illustrated in FIG. 18.

Figure 18:
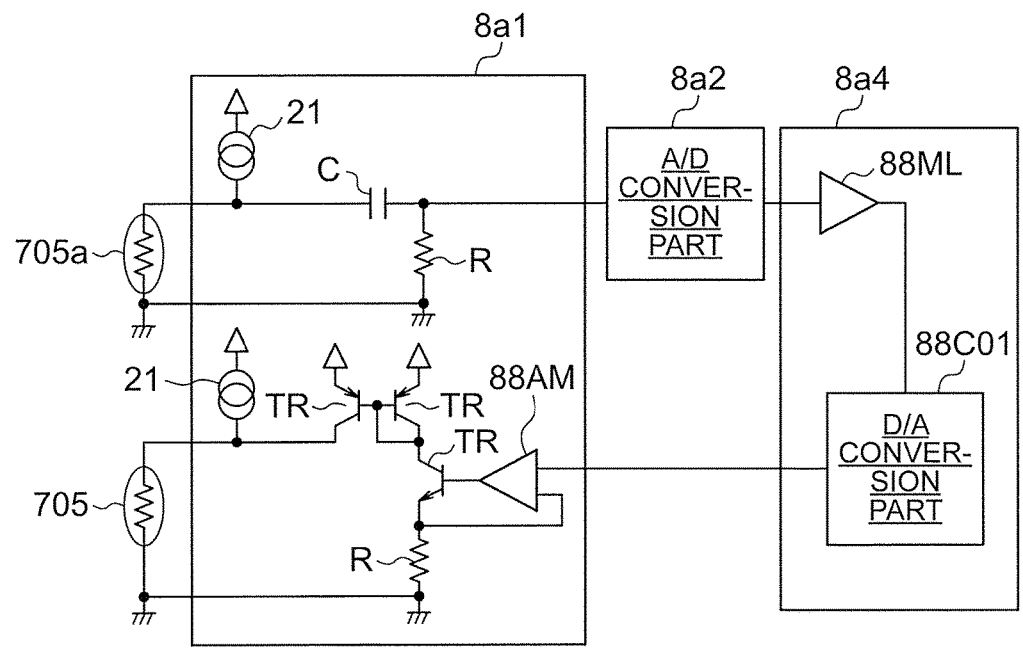
FIG. 18 is a diagram for illustrating an example of a configuration of carrying out the phase lead processing while a constant current value in a voltage conversion part is changed in the physical amount measurement apparatus according to the present invention.

In the circuit of FIG. 18, an AC component of the voltage acquired from the intake air temperature detection resistor 705a is extracted by a circuit of a capacitor C and a resistor R of the voltage conversion part 8a1, and is A/D-converted by the A/D conversion part 8a2. The A/D-converted signal is multiplied by a coefficient by a multiplier 88ML, and is D/A-converted by a D/A conversion part 88CO1. The D/A-converted signal is amplified by an amplifier 88AM, and is input to a current mirror circuit constructed of three transistors TR and a resistor R. As a result, a constant current value from the constant current source 21 is adjusted depending on a current flowing through the resistor R.

As a result of this configuration, as shown by the solid line B of FIG. 16, the intake air temperature output from the intake air temperature detection circuit part 8a has a reduced measurement error with respect to the temperature in the main passage 2, which is the true value, and the response speed to the temperature change in the fluid to be measured can be improved.

Note that, a description is given of the case in which the intake air temperature detection part 7 is constructed only of the intake air temperature detection resistor 705, but the intake air temperature detection resistor 705 for measuring the intake air temperature and another intake air temperature detection resistor 705a for detecting the change in the intake air temperature may be formed on the intake air temperature detection part 7, and the current corrected by the value acquired by differentiating the intake air temperature signal from the other intake air temperature detection resistor 705a and multiplying the derivative by the coefficient may be supplied to the intake air temperature detection resistor 705. As a result of this configuration, the phase lead correction for the intake air temperature is not positive feedback, which prevents excessive correction to improve the precision of the intake air temperature measurement.

Moreover, in the respective embodiments, a description is given of the case in which the current is supplied to the intake air temperature detection resistor 705 to detect the intake air temperature, but a physical amount may be detected by supplying a current or a voltage to a circuit element other than the resistor, such as a capacitor or a coil that changes its element constant depending on a change in the physical amount relating to the fluid to be measured, such as the temperature. Moreover, a description is given of the intake air temperature as an example of the physical amount, but the same effect can be provided by any physical amount measurement apparatus for supplying a current or a voltage to the physical amount detection part to detect a physical amount.

Note that, the present invention is not limited to the respective embodiments, but includes all possible combinations thereof.

Moreover, for the sake of illustration, in FIG. 3, FIG. 12, and FIG. 15, the intake air temperature detection part 7 and the temperature and humidity measurement apparatus 41 constructing the physical amount detection part are respectively illustrated in the intake air temperature measurement apparatus 3 and the intake air and humidity measurement apparatus 3a constructing the physical amount measurement apparatus, but, as illustrated in FIG. 4, FIG. 5, FIG. 10, and FIG. 11, the intake air temperature detection part 7 and the temperature and humidity measurement apparatus 41 are mounted in the flow rate measurement apparatus 1, namely, in the measurement passage 5 and a part of the circuit accommodating part 23 of the main body part 1a.

What is claimed is:

1. A physical amount measurement apparatus mounted integrally with a flow rate measurement apparatus, for measuring a physical amount, the flow rate measurement apparatus comprising:

a main body part extending inward from an outside of a main passage of a fluid to be measured, the main body part having a circuit accommodating part formed therein;

a measurement passage formed on a tip side of the main body part, for causing a part of the fluid to be measured to flow therethrough, the measurement passage having a flow rate detection part arranged therein; and a flow rate detection circuit part, which is arranged in the circuit accommodating part, to generate a signal representing a result of detection of a flow rate by the flow rate detection part; and the physical amount measurement apparatus comprising:

a physical amount detection part to detect a physical amount relating to the fluid to be measured in the flow rate measurement apparatus; and a physical amount detection circuit part, which is arranged in the circuit accommodating part, to carry out a phase lead correction on a signal representing a result of detection of the physical amount part.

2. The physical amount measurement apparatus mounted integrally with a flow rate measurement apparatus according to claim 1, wherein the physical amount detection circuit part is further configured to avoid carrying out the phase lead correction when the result of detection of the flow rate is equal to or more than a predetermined flow rate for which the phase lead correction is unnecessary.

3. The physical amount measurement apparatus mounted integrally with a flow rate measurement apparatus according to claim 1, wherein the physical amount detection circuit part comprises a low-pass filter.

4. The physical amount measurement apparatus mounted integrally with a flow rate measurement apparatus according to claim 1, wherein:

the physical amount detection part is arranged in the measurement passage;

the physical amount measurement apparatus further comprises an intra-circuit physical amount detection circuit part for detecting a physical amount of the same kind as the physical amount in the circuit accommodating part; and the physical amount detection circuit part corrects the physical amount through the phase lead correction, and physical amount difference correction for the physical amounts detected by the physical amount detection part and the intra-circuit physical amount detection circuit part.

5. The physical amount measurement apparatus mounted integrally with a flow rate measurement apparatus according to claim 1, wherein the flow rate detection circuit part is configured to correct a detected flow rate based on the physical amount corrected by the physical amount detection circuit part.

6. The physical amount measurement apparatus mounted integrally with a flow rate measurement apparatus according to claim 1, wherein the physical amount comprises one of a temperature of the fluid to be measured in the measurement passage, and a relative humidity and a temperature for acquiring an absolute humidity of the fluid to be measured inside the main body part of the flow rate measurement apparatus.

7. The physical amount measurement apparatus mounted integrally with a flow rate measurement apparatus according to claim 1, wherein the physical amount detection circuit part is configured to carry out the phase lead correction by changing a correction amount for the phase lead correction depending on the result of detection of the flow rate.

8. The physical amount measurement apparatus mounted integrally with a flow rate measurement apparatus according to claim 7, wherein the physical amount detection circuit part is further configured to avoid carrying out the phase lead correction when the result of detection of the flow rate is equal to or more than a predetermined flow rate for which the phase lead correction is unnecessary.

9. The physical amount measurement apparatus mounted integrally with a flow rate measurement apparatus according to claim 1, wherein:

the physical amount detection part comprises a circuit element having an element constant that changes depending on a change in the physical amount relating to the fluid to be measured; and the physical amount detection circuit part supplies one of a voltage and a current to the circuit element of the physical amount detection part for detecting the physical amount, and, for the phase lead correction, carries out response correction by changing a value of the one of the voltage and the current supplied to the circuit element of the physical amount detection part depending on a variation in the result of detection.

10. The physical amount measurement apparatus mounted integrally with a flow rate measurement apparatus according to claim 9, wherein:

the physical amount detection part comprises a transient state detection circuit element for detecting a transient state of the physical amount; and the physical amount detection circuit part sets a value acquired by differentiating a physical amount signal detected by the transient state detection circuit element of the physical amount detection part and multiplying the derivative by a coefficient as a correction amount for the one of the voltage and the current supplied to the transient state detection circuit element of the physical amount detection part.

11. The physical amount measurement apparatus mounted integrally with a flow rate measurement apparatus according to claim 9, wherein the physical amount detection circuit part is further configured to carry out the response correction by setting a value acquired by differentiating a physical amount signal detected by the circuit element of the physical amount detection part and multiplying the derivative by a coefficient as a correction amount for the one of the voltage and the current supplied to the physical amount detection part.

12. The physical amount measurement apparatus mounted integrally with a flow rate measurement apparatus according to claim 11, wherein the physical amount detection circuit part is further configured to carry out the response correction by changing the coefficient depending on the result of detection of the flow rate.

13. A physical amount measurement apparatus mounted integrally with a flow rate measurement apparatus, for measuring a physical amount, the flow rate measurement apparatus comprising:

a main body part extending inward from an outside of a main passage of a fluid to be measured, the main body part having a circuit accommodating part formed therein;

a measurement passage formed on a tip side of the main body part, for causing a part of the fluid to be measured to flow therethrough, the measurement passage having a flow rate detection part arranged therein; and a flow rate detection circuit part, which is arranged in the circuit accommodating part, to generate a signal representing a result of detection of a flow rate by the flow rate detection part; and the physical amount measurement apparatus comprising:
   a physical amount detection part to detect a physical amount relating to the fluid to be measured in the flow rate measurement apparatus; and
   a physical amount detection circuit part, which is arranged in the circuit accommodating part, to generate a signal acquired by carrying out phase lead correction on a signal representing a result of detection the physical amount detection part,
wherein the physical amount detection circuit part comprises a digital filter to carry out the phase lead correction.

14. The physical amount measurement apparatus mounted integrally with a flow rate measurement apparatus according to claim 13, wherein the physical amount detection circuit part is further configured to avoid carrying out the phase lead correction when the result of detection of the flow rate is equal to or more than a predetermined flow rate for which the phase lead correction is unnecessary.

15. The physical amount measurement apparatus mounted integrally with a flow rate measurement apparatus according to claim 13, wherein the physical amount detection circuit part is configured to carry out the phase lead correction by changing a correction amount for the phase lead correction depending on the result of detection of the flow rate.

16. The physical amount measurement apparatus mounted integrally with a flow rate measurement apparatus according to claim 15, wherein the physical amount detection circuit part is further configured to avoid carrying out the phase lead correction when the result of detection of the flow rate is equal to or more than a predetermined flow rate for which the phase lead correction is unnecessary.

17. A physical amount measurement method for a physical amount measurement apparatus mounted integrally with a flow rate measurement apparatus, in measurement of a physical amount of a fluid to be measured for adjusting a value detected by the flow rate measurement apparatus,
   the flow rate measurement apparatus which accommodates a flow rate detection circuit part configured to generate a signal representing a result of detection of a flow rate of the fluid to be measured detected by a flow rate detection part in a main body part extending inward from an outside of a main passage of the fluid to be measured,
   the flow rate measurement apparatus comprising a measurement passage formed on a tip side of the main body part, for causing a part of the fluid to be measured to flow therethrough, the measurement passage having the flow rate detection part arranged therein,
   the physical amount measurement method comprising:
      detecting, by the physical amount measurement apparatus mounted integrally with the flow rate measurement apparatus, a physical amount relating to the fluid to be measured in the flow rate measurement apparatus; and
      carrying out, by the physical amount measurement apparatus, a phase lead correction on a signal representing a result of detection of the physical amount.

* * * * *